US010600252B2

(12) United States Patent
Bhatnagar et al.

(10) Patent No.: US 10,600,252 B2
(45) Date of Patent: *Mar. 24, 2020

(54) COARSE RELOCALIZATION USING SIGNAL FINGERPRINTS

(71) Applicant: Microsoft Technology Licensing, LLC, Redmond, WA (US)

(72) Inventors: Tushar Cyril Bhatnagar, Seattle, WA (US); Gavin Dean Lazarow, Redmond, WA (US); Jonathan Paul Rosenberg, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,512

(22) Filed: Jun. 3, 2019

(65) Prior Publication Data

US 2019/0287311 A1    Sep. 19, 2019

Related U.S. Application Data

(63) Continuation-in-part of application No. 15/624,601, filed on Jun. 15, 2017.
(Continued)

(51) Int. Cl.
*G06T 19/00*    (2011.01)
*G06F 3/01*    (2006.01)
(Continued)

(52) U.S. Cl.
CPC ............ *G06T 19/006* (2013.01); *G06F 3/011* (2013.01); *G06K 9/6215* (2013.01); *G06T 15/08* (2013.01); *H04B 17/318* (2015.01)

(58) Field of Classification Search
CPC .... H04N 13/128; H04N 5/247; H04N 13/366; H04N 13/344; G01S 3/00; G02B 27/017;
(Continued)

(56) References Cited

U.S. PATENT DOCUMENTS 5,959,575 A * 9/1999 Abbott .................. G01C 21/00
                                                                        342/357.31
6,009,359 A * 12/1999 El-Hakim ............... G01C 11/02
                                                                        348/135
(Continued)

OTHER PUBLICATIONS

Sung, et al.,"Location-Based Multi-User Interaction Based on Mobile Head Mount Display", In Journal of Advanced Science Letters, vol. 22, No. 9, Sep. 1, 2016, pp. 2354-2357.
(Continued)

*Primary Examiner* — Lewis G West
(74) *Attorney, Agent, or Firm* — Alleman Hall Creasman & Tuttle LLP

(57) ABSTRACT

A first display device and method are provided for accelerating the coarse relocalization process of the first display device by generating a session-specific identifier and sending it to a second display device, which transmits the identifier to a cloud service, which returns at least a portion of a map data set corresponding to the identifier. The returned map data set is then stitched into the local map data of the first display device to create an integrated map, which is used to render one or a plurality of holograms. The first display device may comprise a processor, a memory operatively coupled to the processor, and a fingerprint program stored in the memory and executed by the processor.

20 Claims, 18 Drawing Sheets

Related U.S. Application Data

(60) Provisional application No. 62/479,205, filed on Mar. 30, 2017.

(51) Int. Cl.
  *H04B 17/318* (2015.01)
  *G06K 9/62* (2006.01)
  *G06T 15/08* (2011.01)

(58) Field of Classification Search
  CPC .......... G02B 27/0172; G02B 2027/014; G02B 2027/0138; G02B 2027/0134
  See application file for complete search history.

(56) References Cited

U.S. PATENT DOCUMENTS

| | | | |
|---|---|---|---|
| 6,317,686 B1 | 11/2001 | Ran | |
| 6,349,249 B1* | 2/2002 | Cunningham | E21D 9/004 701/28 |
| 6,608,913 B1* | 8/2003 | Hinton | B82Y 15/00 382/104 |
| 6,711,475 B2* | 3/2004 | Murphy | G01C 11/02 701/3 |
| 6,801,855 B1 | 10/2004 | Walters et al. | |
| 6,807,478 B2* | 10/2004 | Giannopoulos | G01S 1/70 701/434 |
| 6,917,893 B2* | 7/2005 | Dietsch | G01C 15/002 702/150 |
| 7,302,359 B2* | 11/2007 | McKitterick | G01C 7/06 340/990 |
| 7,313,402 B1* | 12/2007 | Rahman | H04W 24/06 455/456.1 |
| 8,254,699 B1* | 8/2012 | Zhao | G06K 9/6232 348/699 |
| 8,275,893 B1 | 9/2012 | Chi et al. | |
| 8,350,758 B1* | 1/2013 | Parvizi | G01S 5/0252 342/451 |
| 8,463,018 B2* | 6/2013 | Chung | G05D 1/0274 15/340.1 |
| 8,886,219 B2 | 11/2014 | Meredith et al. | |
| 8,933,931 B2 | 1/2015 | Izadi et al. | |
| 8,934,921 B2 | 1/2015 | Marti et al. | |
| 9,009,629 B2 | 4/2015 | Meredith et al. | |
| 9,282,435 B2 | 3/2016 | Ward et al. | |
| 9,369,847 B2 | 6/2016 | Borghei | |
| 9,754,419 B2* | 9/2017 | Petrovskaya | G06T 19/006 |
| 9,916,002 B2* | 3/2018 | Petrovskaya | G06Q 50/01 |
| 9,918,203 B2* | 3/2018 | Huang | H04W 4/043 |
| 10,043,319 B2* | 8/2018 | Petrovskaya | G06T 19/006 |
| 10,217,120 B1* | 2/2019 | Shin | G06Q 30/0201 |
| 2004/0189517 A1* | 9/2004 | Pande | G01S 5/0018 342/357.4 |
| 2007/0001904 A1* | 1/2007 | Mendelson | G01C 21/206 342/450 |
| 2007/0026870 A1* | 2/2007 | Spain | G01S 5/0252 455/456.1 |
| 2007/0149216 A1* | 6/2007 | Misikangas | H04W 64/00 455/456.1 |
| 2007/0271011 A1* | 11/2007 | Lee | G05D 1/0242 700/245 |
| 2008/0033645 A1* | 2/2008 | Levinson | G01C 15/00 701/469 |
| 2008/0153516 A1* | 6/2008 | Hsieh | H04L 67/18 455/456.6 |
| 2009/0043440 A1* | 2/2009 | Matsukawa | G05D 1/0214 701/25 |
| 2009/0254843 A1* | 10/2009 | Van Wie | H04L 12/1822 715/757 |
| 2009/0262974 A1* | 10/2009 | Lithopoulos | G06T 7/73 382/100 |
| 2010/0106745 A1* | 4/2010 | Cho | G01S 5/0252 707/802 |
| 2010/0121488 A1* | 5/2010 | Lee | G01C 21/32 700/245 |
| 2010/0123737 A1* | 5/2010 | Williamson | G01C 21/3647 345/672 |
| 2010/0189312 A1* | 7/2010 | Nielsen | G01C 15/02 382/113 |
| 2011/0081919 A1* | 4/2011 | Das | H04W 4/029 455/456.1 |
| 2011/0199259 A1* | 8/2011 | Karaoguz | G01S 19/48 342/357.28 |
| 2012/0052884 A1 | 3/2012 | Bogatin | |
| 2013/0106592 A1 | 5/2013 | Morgan | |
| 2013/0116968 A1* | 5/2013 | Wirola | G01S 5/0252 702/150 |
| 2013/0121600 A1* | 5/2013 | Lin | G06K 9/4676 382/224 |
| 2013/0317944 A1 | 11/2013 | Huang et al. | |
| 2014/0049559 A1* | 2/2014 | Fleck | G03H 1/2249 345/633 |
| 2014/0063055 A1* | 3/2014 | Osterhout | G06F 3/005 345/633 |
| 2014/0192084 A1 | 7/2014 | Latta et al. | |
| 2014/0314322 A1* | 10/2014 | Snavely | G06K 9/00664 382/190 |
| 2015/0172626 A1* | 6/2015 | Martini | G06T 7/0008 348/50 |
| 2015/0235370 A1* | 8/2015 | Abovitz | G06F 16/7837 382/103 |
| 2015/0281910 A1 | 10/2015 | Choudhury et al. | |
| 2015/0356783 A1* | 12/2015 | Miller | G06F 3/011 345/633 |
| 2016/0086382 A1 | 3/2016 | Kipman et al. | |
| 2016/0133230 A1* | 5/2016 | Daniels | G06T 19/006 345/633 |
| 2016/0171777 A1 | 6/2016 | Anderson et al. | |
| 2017/0108575 A1* | 4/2017 | Yang | H04W 64/00 |
| 2017/0228935 A1 | 8/2017 | Foster et al. | |
| 2017/0343638 A1* | 11/2017 | Jampani | G01S 5/0252 |
| 2018/0014161 A1* | 1/2018 | Warren | H04W 4/021 |
| 2018/0098196 A1* | 4/2018 | Dal Santo | H04L 67/02 |
| 2018/0100916 A1* | 4/2018 | Gullicksen | G01S 5/0226 |
| 2018/0264347 A1* | 9/2018 | Tran | G16H 50/20 |
| 2018/0285052 A1* | 10/2018 | Eade | G06F 3/1454 |
| 2018/0288386 A1 | 10/2018 | Lazarow et al. | |

OTHER PUBLICATIONS

Yu, et al.,"5 G WiFi Signal-Based Indoor Localization System Using Cluster k-Nearest Neighbor Algorithm", In International Journal of Distributed Sensor Networks, Dec. 16, 2014, pp. 1-12.

"Notice of Allowance Issued in U.S. Appl. No. 15/624,601", dated Jun. 3, 2019, 12 Pages.

\* cited by examiner

COARSE RELOCALIZATION USING SIGNAL FINGERPRINTS

CROSS REFERENCE TO RELATED APPLICATIONS

This application is a continuation-in-part of U.S. application Ser. No. 15/624,601, filed Jun. 15, 2017, which claims priority to U.S. Provisional Patent Application Ser. No. 62/479,205 filed Mar. 30, 2017, the entire disclosures of each of which are hereby incorporated herein by reference for all purposes.

BACKGROUND

6-DoF tracking, also known as six degrees of freedom tracking, is a method by which a device (e.g. mixed-reality head-mounted device (HMD), robot, smartphone, etc.) uses sensors (e.g. cameras, inertial measurement units, etc.) to localize itself, or determine its position relative to its surrounding physical environment. When a device is turned on in a new environment, the device initially performs a coarse relocalization step, in which the rough vicinity of the current location of the device is determined, before the device performs a more fine-grained localization step to determine a more precise position of itself relative to its surrounding physical environment. For example, a mixed-reality HMD or smartphone can use this positional understanding to place holograms or digital content so as to appear to be world-locked to a position in the physical world, and a robot can use this positional understanding to navigate itself relative to its surroundings.

Of increasing value is the ability of the device to quickly orient itself or determine its own position relative to a three-dimensional coordinate space of the physical environment by efficiently loading the appropriate map data sets to accelerate the coarse relocalization step before proceeding to the more fine-grained localization step. A conventional method of self-orientation is to load all the map data sets of the physical environment into memory before the device starts to orient itself. However, this conventional method may be associated with practical disadvantages, including large memory requirements and long load times.

SUMMARY

To address these issues, a first display device and method are provided to streamline and accelerate the coarse relocalization process of the first display device. The first display device may comprise a processor, a memory operatively coupled to the processor, and a client fingerprint program stored in the memory and executed by the processor.

The client fingerprint program may be configured to receive a session-specific identifier from a second device, the session-specific identifier corresponding to a map data set; transmit the session-specific identifier to a remote system; receive from the remote system the map data set corresponding to the session-specific identifier; and stitch the map data set into a local map data of the first display device to create an integrated map.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
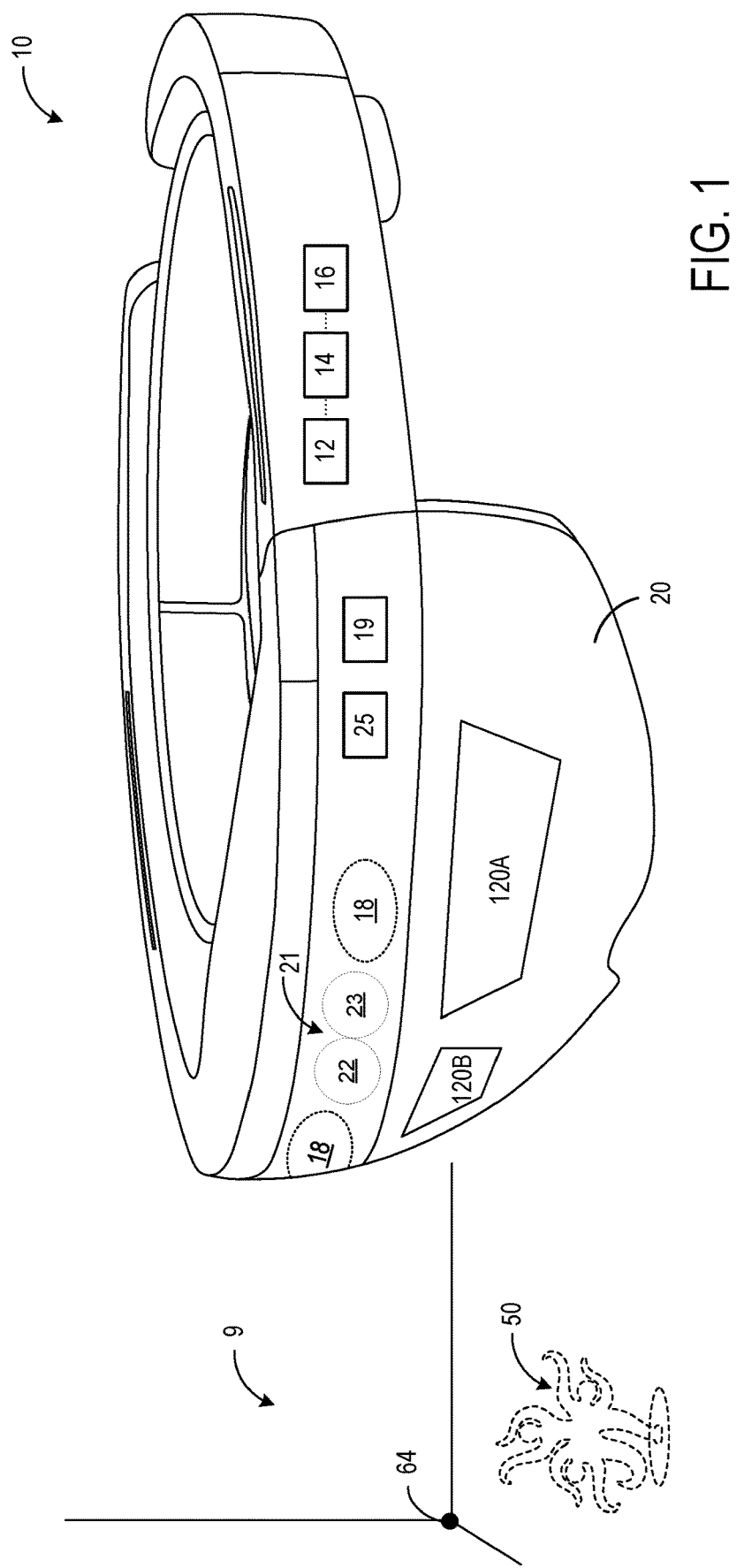
FIG. 1 shows a computing device in the form of a head-mounted display device, according to an example embodiment of the present disclosure.

FIG. 1 illustrates a head mounted display device 10 embodiment of the computing device 10, according to one embodiment of the present disclosure, which has been conceived to address the issues discussed above. As shown, the computing device 10 includes processor 12, volatile storage device 14, non-volatile storage device 16, cameras 18, display 20, active depth camera 21. The processor 12 is configured to execute software programs stored in non-volatile storage device 16 using portions of volatile storage device 14 to perform the various functions recited herein. In one example, the processor 12, volatile storage device 14, and non-volatile storage device 16 may be included in a system-on-chip configuration included in the head mounted display device 10. It will be appreciated that the computing device 10 may also take the form of other types of mobile computing devices, such as, for example, a smartphone device, a tablet device, a laptop, a machine vision processing unit for an autonomous vehicle, robot, drone, or other types of autonomous devices, etc. In the systems described herein, devices in the form of computing device 10 may be utilized as a display device as illustrated in FIGS. 2-8C, discussed below.

Display 20 is configured to be at least partially see-through, and includes right and left display regions 120A, 120B which are configured to display different images to each eye of the user. By controlling the images displayed on these right and left display regions 120A, 120B, a hologram 50 may be displayed in a manner so as to appear to the eyes of the user to be positioned at a distance from the user within the physical environment 9. As used herein, a hologram is an image formed by displaying left and right images on respective left and right near-eye displays that appears due to stereoscopic effects to be positioned at a distance from the user. Typically, holograms are anchored to the map of the physical environment by virtual anchors 64, which are placed within the map according to their coordinates and typically positioned on visual features recognizable through image processing of captured images of the environment. These anchors are world-locked, and the holograms are configured to be displayed in a location that is computed relative to the anchor. Typically the holograms are defined so as to be displayed within a threshold distance such as 3 meters from their corresponding anchor, although other threshold distances may be used.

In the configuration illustrated in FIG. 1, a plurality of cameras 18 are provided on the computing device 10 and are configured to capture images of the surrounding physical environment of the computing device 10. In one embodiment, four cameras 18 are provided, although the precise number of cameras 18 may vary. The raw images from the cameras 18 may be stitched together with perspective correction to form a 360 degree view of the physical environment, in some configurations. Typically, cameras 18 are visible light cameras. Images from two or more of the cameras 18 may be compared to provide an estimate of depth, using passive stereo depth estimation techniques.

In addition to visible light cameras 18, a depth camera 21 may be provided that uses an active non-visible light illuminator 23 and non-visible light sensor 22 to emit light in a phased or gated manner and estimate depth using time of flight techniques, or to emit light in structured patterns and estimate depth using structured light techniques.

Computing device 10 also typically includes a six degree of freedom inertial motion unit 19 that includes accelerometers, gyroscopes, and possibly magnetometers configured to measure the position of the computing device in six degrees of freedom, namely x, y, z, pitch, roll and yaw.

Data captured by the visible light cameras 18, the depth camera 21, and the inertial motion unit 19 can be used to perform simultaneous location and mapping (SLAM) within the physical environment 9, to thereby produce a map of the physical environment including a mesh of reconstructed surfaces, and to locate the computing device 10 within the map of the physical environment 9. The location of the computing device 10 is computed in six degrees of freedom, which is important to displaying world-locked holograms 50 on the at least partially see through display 20. Without an accurate identification of the position and orientation of the computing device 10, holograms 50 that are displayed on the display 20 may appear to slightly move or vibrate relative to the physical environment, when they should remain in place, in a world-locked position. This data is also useful in relocating the computing device 10 when it is turned on, a process which involves ascertaining its position within the map of the physical environment, and loading in appropriate data from non-volatile memory to volatile memory to display holograms 50 located within the physical environment.

The IMU 19 measures the position and orientation of the computing device 10 in six degrees of freedom, and also measures the accelerations and rotational velocities. These values can be recorded as a pose graph to aid in tracking the display device 10. Accordingly, even when there are few visual cues to enable visual tracking, in poorly lighted areas or texture-less environments for example, accelerometers and gyroscopes can still enable spatial tracking by the display device 10 in the absence of visual tracking. Other components in the display device 10 may include and are not limited to speakers, microphones, gravity sensors, Wi-Fi sensors, temperature sensors, touch sensors, biometric sensors, other image sensors, eye-gaze detection systems, energy-storage components (e.g. battery), a communication facility, etc.

Figure 2:
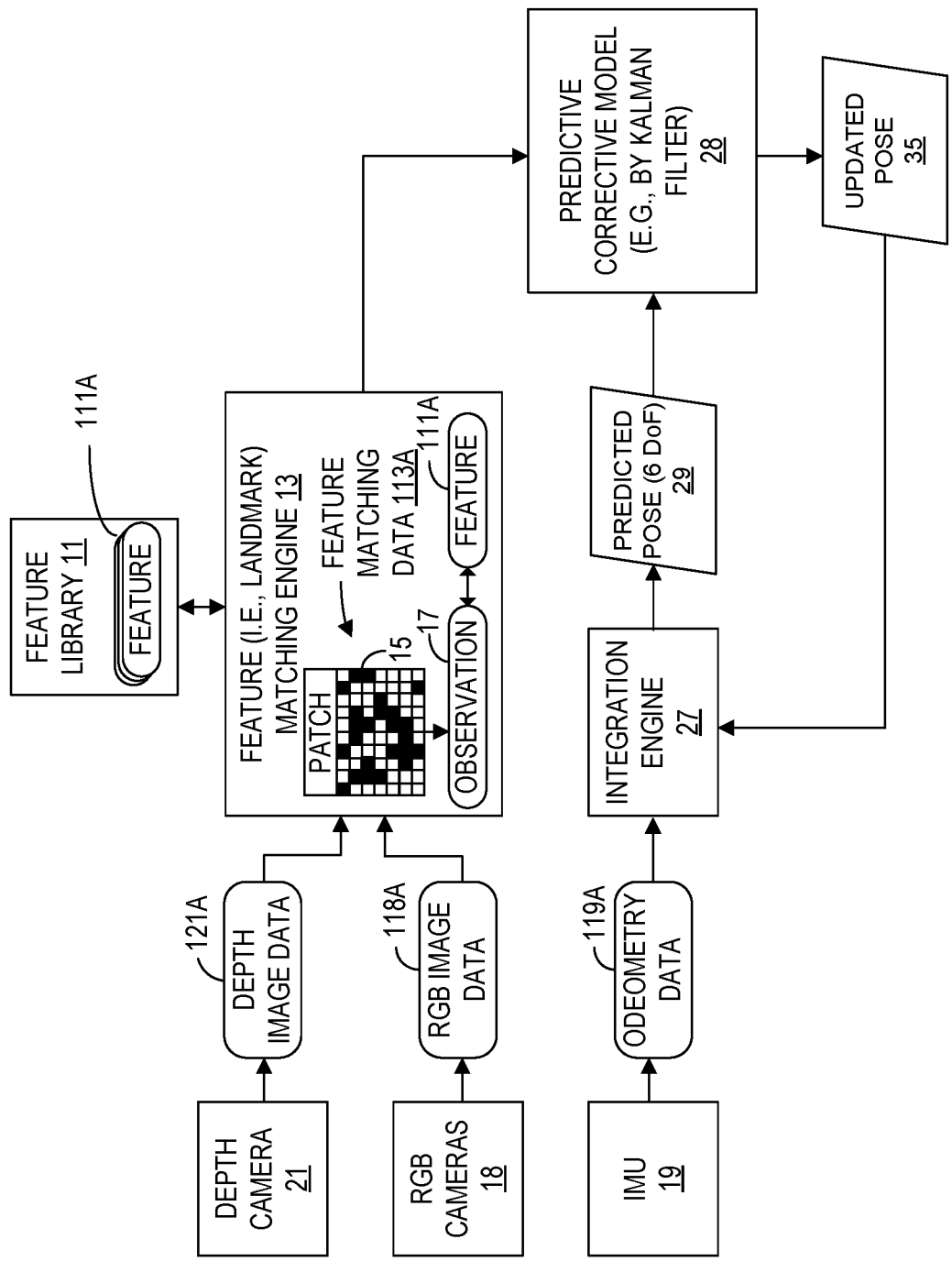
FIG. 2 is a schematic view of an example predictive corrective algorithm for simultaneous location and mapping by the computing device of FIG. 1 within a physical environment.

FIG. 2 illustrates a general overview of one possible SLAM algorithm for simultaneous location and mapping by computing device 10. According to the SLAM algorithm, a predictive corrective model 28 is typically applied, which may, for example, be a Kalman filter. In each frame (i.e., timestep), a predicted pose 29 in a next frame is computed based on odeometry data 119A from IMU 19 by an integration engine 27, and then a correction to the predicted pose 29 is computed by the predictive corrective model (e.g., Kalman filter) 28 based on estimated and observed positions of features in the physical environment 9 sensed by sensors such as cameras 18 and depth camera 21, and finally the predicted pose 29 is updated and an updated pose 35 is fed back to the integration engine 27, for computing the predicted pose 29 at the subsequent time step. Additional sensors such as LIDAR, microphone arrays, etc. may also be used to obtain observations of features in the environment which may be used to compute the correction and updated pose by the predictive corrective model 28.

Feature descriptors 111A that describe features such as edges, corners, and other patterns that are detectable through image processing techniques are prestored in a feature library 11 in non-volatile storage device 16. In real time, images 118A and depth images 121A are respectively captured by cameras 18 and depth camera 21, and processed by a feature matching engine 13 executed by processor 12 to detect whether features matching the prestored feature descriptors 111A are present in the captured images 118A, 121A by looking for regions in the captured images that match the feature descriptors 111A. Some of the detected features may have anchors 64 associated with them, since anchors are often positioned on such visually recognizable features in an environment. For each detected feature, the location (e.g., coordinate area) and type of the feature are stored as observation data 17 associated with each frame. It will be appreciated that dozens or hundreds of such features may be recognized in an image, and the collection of these observations 17 of features may be referred to informally as a pointcloud of detected features in the image. Further, for at least selected detected features in the image, a patch 15 from the image is taken surrounding the selected detected features and stored in memory for later recall. This patch 15 is typically a two-dimensional array of pixels or voxels from the region of the captured image, and can be used in future localization steps when the computing device 10 captures images of the selected detected features from another angle, by performing perspective correction on the patch to determine whether (and where) the selected detected features in the perspective corrected patch are present in the subsequent image. The physical manifestations of these selected detected features in the physical environment are also known as anchors. The features matching the feature descriptors 111A, observations 17, and patches 15 for each frame are collectively referred to as feature matching data 113A. The feature matching data 113A typically does not include the depth image 121A or RGB image data 118A. The feature matching data 113A may be stored in non-volatile or volatile memory for certain of the frames, referred to as keyframes, as discussed below. Together, the pose graph 80, feature matching data 113A, surface reconstruction data 82, and keyframes 84 linked by pose graph 80 may collectively be referred to as map data 86. As the computing device 10 moves throughout the physical environment 9, it maps the environment and stores its aggregated knowledge of the environment as map data 86. As will be discussed below, sharing of a portion of this aggregated map data with another device, either directly or through intermediary devices such as a server, can enable other devices to more quickly and accurately localize themselves within the physical environment, saving time and processing power for the other devices.

Figure 3:
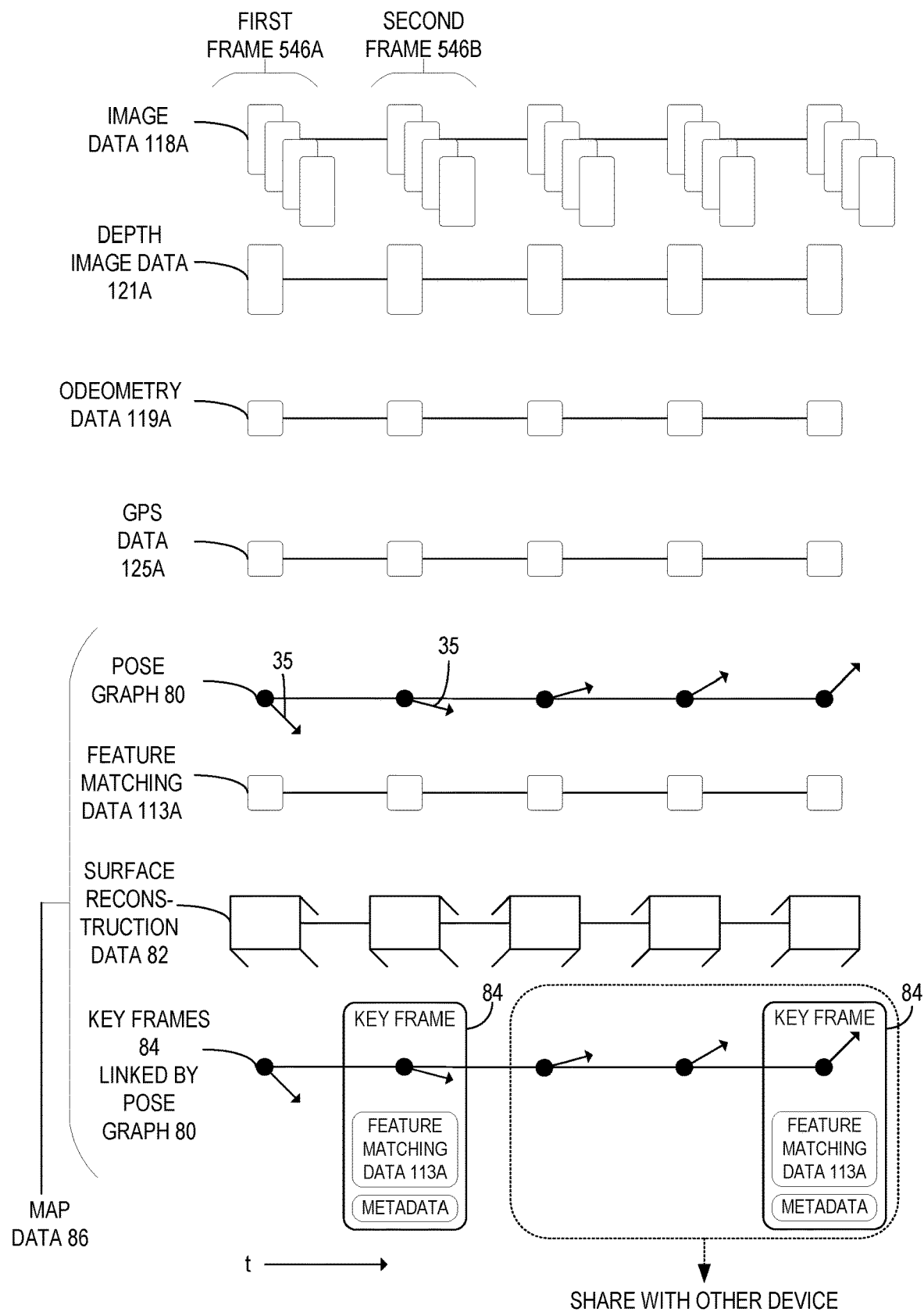
FIG. 3 is a time series view of data captured by various sensors of the computing device of FIG. 1 and processed to generate a series of key frames linked by a pose graph.

FIG. 3 shows an example schematic representation of data collected by the cameras 18, depth camera 21, IMU 19, and GPS receiver 25 in the sensor suite of the computing device 10, and processed by the processor 12 of the computing device 10. The data points in FIG. 3 are shown arranged along a time axis, where later times are shown to the right of earlier times. Typically, data is collected periodically from each sensor, at a sampling rate. The sampling rate of the various sensors is depicted to be quantized at the same sampling rate in the figure for ease of illustration (although in practice the sampling rates may differ), and each timestep at which data is sampled from the sensors is referred to as a frame 546. Thus, in the first frame 546A, second frame 546B, and each frame thereafter, image data 118A is collected by cameras 18 (four cameras in this example), depth camera data 121A is collected using depth camera 21, odeometry data 119A is collected by IMU 19, and GPS data 125A is collected by GPS receiver 25.

The processor 12 may use simultaneous localization and mapping (SLAM) techniques, discussed above, based on sensor suite inputs include the image data 118A, depth image data 121A, odeometry data 119A, and GPS data 125A to generate pose graph 80, feature matching data 113A, and surface reconstruction data 82. The pose graph 80 is a directed graph with nodes that are a series of updated poses 35 detected over time. A pose is typically a unit vector with an origin at a predetermined location (x, y, and z) and extending in a predetermined orientation (pitch, yaw, and roll) in the physical space, and is calculated as described in relation to FIG. 2. The origin corresponds to a predetermined fixed location on the computing device, such as equidistant between the left and right displays, and the unit vector extends outward in at a fixed attitude from the display, in a gaze direction of the user. The processor 12 typically generates the pose graph 80 in each frame, but alternatively may generate the pose graph 80 less often, such as every other frame, etc. The surface reconstruction data 82 typically includes a mesh of detected surfaces in the physical environment that have been detected using depth image data 121A and/or stereoscopic analysis of the image data 118A. As discussed above, the feature data 113A typically includes one or more patch, observation, and/or feature descriptor associated with each pose of the pose graph 80.

The processor 12 may generate and store in memory key frame data which includes a plurality of key frames 84. Each key frame 84 includes one pose of the pose graph 80, and thus the key frames 84 are linked by the pose graph 80. Each key frame 84 further includes the feature matching data 113A, which includes one or more (and typically multiple) observations 17, features matching feature descriptors 111A, and associated patch 15 for that frame. The key frame data may further include metadata, which may for example include GPS data 125A, odeometry data 119A, hardware data (e.g., camera lens type), ambient temperature, etc. applicable for the frame. The key frames 84 may be generated at a periodic interval within the series of successive frames, such as every other frame, or every $10^{th}$ frame, etc. Alternatively, key frames 84 may be generated at a predetermined spatial interval as the computing device 10 moves through the physical environment 9, such as every 1 or 2 meters.

Figure 4A:
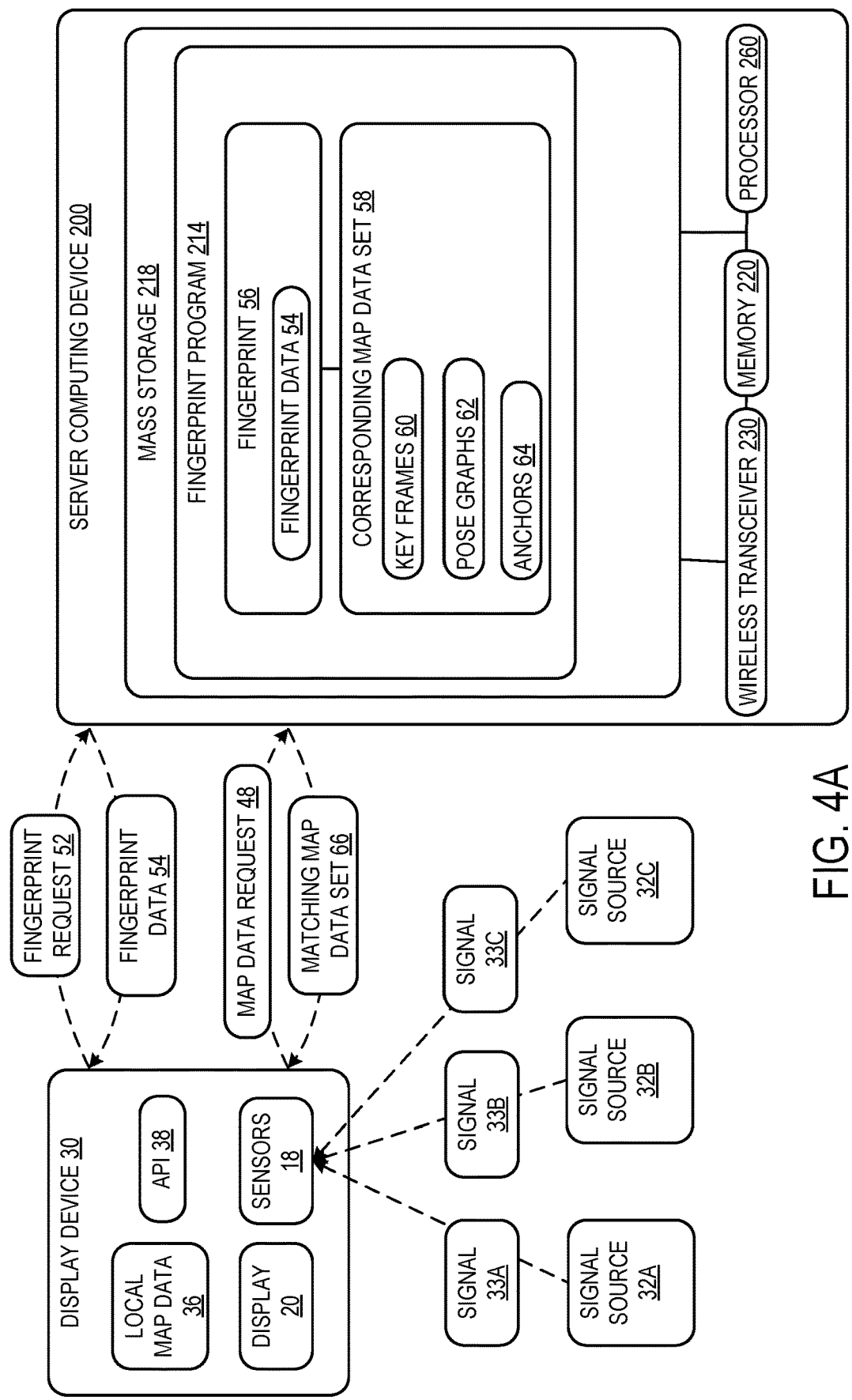
FIG. 4A is a schematic view of a computing device for generating a current fingerprint, comparing the current fingerprint against fingerprint data, and sending a request for a matching map data set according to a first embodiment of the present disclosure.

FIG. 4A is a schematic illustration of a display device generating a current signal fingerprint (hereinafter referred to as "current fingerprint") and interacting with a server computing device according to the first embodiment of the present disclosure. As explained in more detail below, the server computing device 200 may be used to store signal fingerprint data 54 (hereinafter referred to as "fingerprint data") and map data sets 58. Computing device 200 may take the form of a server, networking computer, gaming console, mobile communication device, desktop computer, laptop computer, tablet computer, set-top box (e.g. cable television box, satellite television box), or any other type of suitable computing device. In some examples, computing device 200 may comprise an embedded system within a larger electronic or mechanical device or system. In other examples, the computing device 200 may be identical to the display device 30. Additional details regarding the components and computing aspects of the computing device 200 are described in more detail below with respect to FIG. 9.

The server computing device 200 may include a server fingerprint program 214 that may be stored in mass storage 218 of the computing device 200. The server fingerprint program 214 may be loaded into memory 220 and executed by a processor 260 of the server computing device 200 to perform one or more of the methods and processes for sending fingerprint data 54 to the display device 30 responsive to receiving a fingerprint request 52 from the display device 30, and retrieving and sending one or a plurality of corresponding map data sets to a display device 30 responsive to receiving a map data request 48 from the display device 30 as described in more detail below. The server computing device 200 may be configured with a wireless transceiver 230 that wirelessly communicates with the display device 30 to receive fingerprint requests 52 and map data requests 48 from the display device 30 and transmits fingerprint data 54 and matching map data sets 66 to the display device 30. It will be appreciated that matching map data sets 66 are one or a plurality of map data sets corresponding to one or a plurality of closest matching fingerprints. The type of map data applied in the present disclosure is not particularly limited, and will be understood to be any set of data that correlates points in the three-dimensional coordinate space in the physical environment to information that help orient and locate the display device in the three-dimensional space. One possible embodiment of this map data is described in more detail below with respect to FIGS. 6 and 7, and includes keyframes 60, pose graphs 62, and anchors 64 in the form of anchor data. The format of the anchor data is not particularly limited, and may be encoded as unique string identifiers, which identify the anchor, and coordinates, which identify the position of the anchor within the map.

The server computing device 200 may be communicatively coupled to one or more other devices via a wired connection or a wireless connection to a network. In some examples, the network may take the form of a local area network (LAN), wide area network (WAN), wired network, wireless network, personal area network, or a combination thereof, and may include the Internet. In the example of FIG. 4A, server computing device 200 is communicatively coupled to a display device 30 via one or more networks. In other examples the server computing device 200 may be operatively connected with additional devices. The display 20 of the display device 30 may display one or more holograms at a virtual place-located anchor 64 from the vantage point of the display device 30. In some examples, the virtual location of the virtual place-located anchor 64 may be world-locked to a virtual position that is fixed in a three-dimensional coordinate space overlaid upon the real world three-dimensional environment. In other examples, the virtual location of the virtual place-located anchor 64 may be world-locked to a virtual position relative to an object in a real world three-dimensional environment.

The one or more processors of the display device 30 execute a client fingerprint program 38. The display device 30 stores into local memory a local map data 36. The local map data 36 may include the recorded rotational and translational motions of the display device 30 tracked by the visual sensors and/or inertial measurement sensors 18 in the display device 30. The display device 30 may be communicatively coupled to one or more other devices via a wired connection or a wireless connection to a network, but the communicative coupling is not particularly limited, and may encompass any form of data stream, including Wi-Fi, e-mail, external data storage devices, cloud storage devices, etc. In some examples, the network may take the form of a local area network (LAN), wide area network (WAN), wired network, wireless network, personal area network, or a combination thereof, and may include the Internet.

Figure 4B:
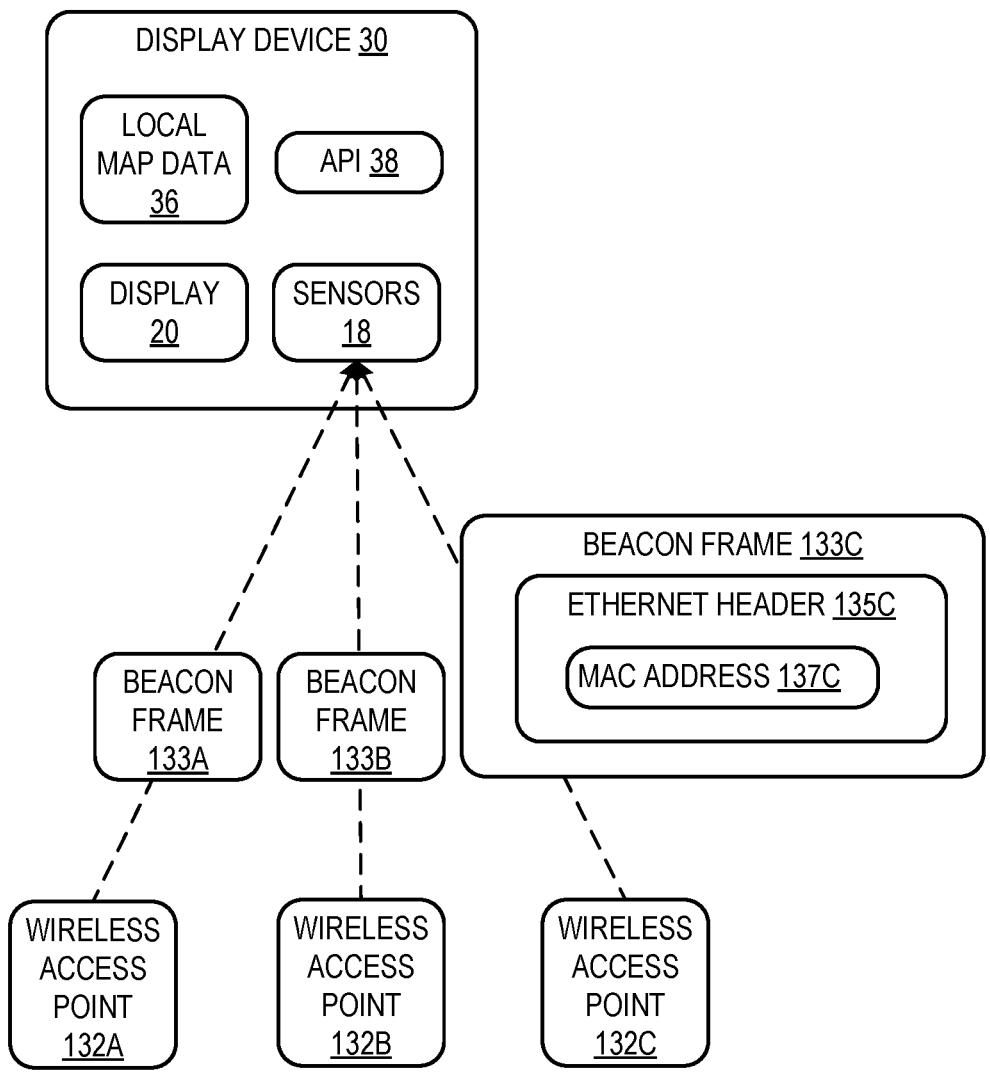
FIG. 4B is a schematic view of a computing device depicting one example of the signals and signal sources shown in FIG. 4A.

The sensor 18 in the display device receives signals 33 from one or a plurality of signal sources 32. The signal sources 32 may include at least one of a radiofrequency source, an electromagnetic source, a light source, a sound source, and a heat source. The signals 33 may include at least one of electromagnetic signals, gravity, magnetic fields, and temperature. The electromagnetic signals may include at least one of FM signals, GPS signals, cellular signals, and Wi-Fi signals. Referring to FIG. 4B, the signal sources may comprise one or a plurality of wireless access points 132A-C that broadcast beacon frames 133A-C. Each beacon frame 133C comprises an Ethernet header 135C in which a MAC address 137C is included. The body of the beacon frame 133C may comprise an SSID (not illustrated). The beacon frame 133C provides information on a type, make, or model of the originating wireless access point 132C.

Returning to FIG. 4A, responsive to the sensors 18 receiving the signals 33A-C from the signal sources 32A-C, the display device 30 records these detected signals 33A-C and packages them into a current fingerprint that is associated with a current time. The generation of the current fingerprint may be continuously performed in real time, or periodically performed at regular or irregular time intervals in batches. In other embodiments, the current fingerprint may be generated at one or a plurality of predetermined events, such as when the display device 30 is turned on. It will be appreciated that the format of the current fingerprint is similar to the format of the fingerprints 56 in the mass storage 218 of the server computing device, so that the data in the current fingerprint can be compared and contrasted to the fingerprint data 54 of the fingerprints 56.

Independently of the generation of the current fingerprint, the display device 30 also retrieves fingerprint data 54 from the server computing device 200. The server computing device 200 may send the fingerprint data 54 to the display device 30 responsive to a fingerprint request 52 sent by the display device 30. However, it will be appreciated that the server computing device 200 may alternatively or additionally initiate the sending of fingerprint data 54 to the display device 30 even when not prompted to do so by an instruction or request.

Figure 4C:
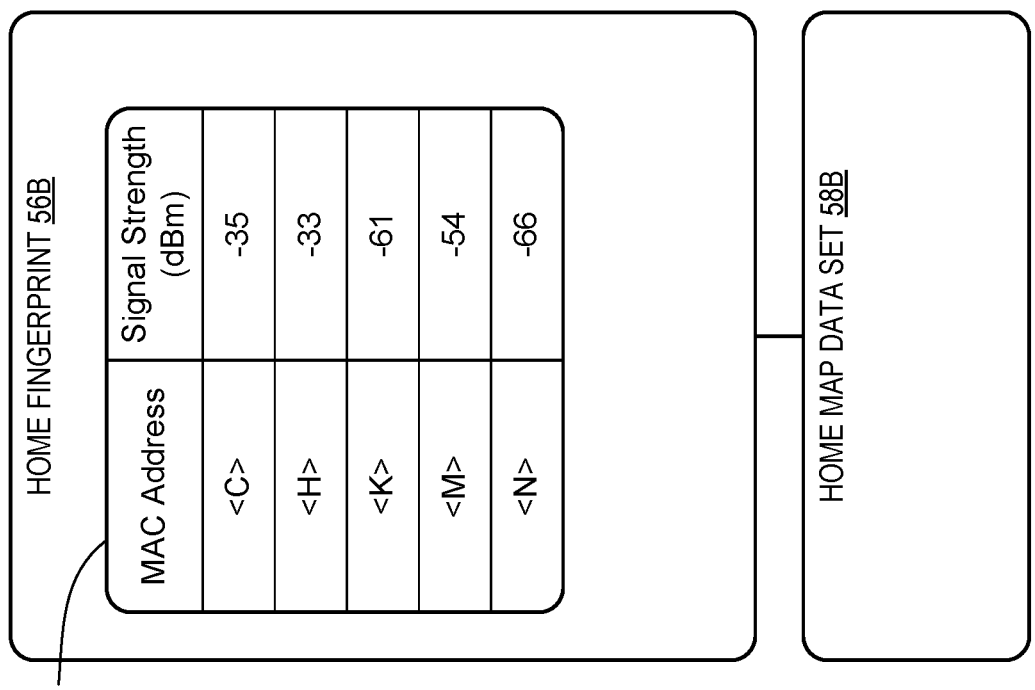
FIG. 4C is a detailed schematic view of one example of the fingerprints, fingerprint data, and corresponding map data sets shown in FIG. 4A.
Figure 4C:
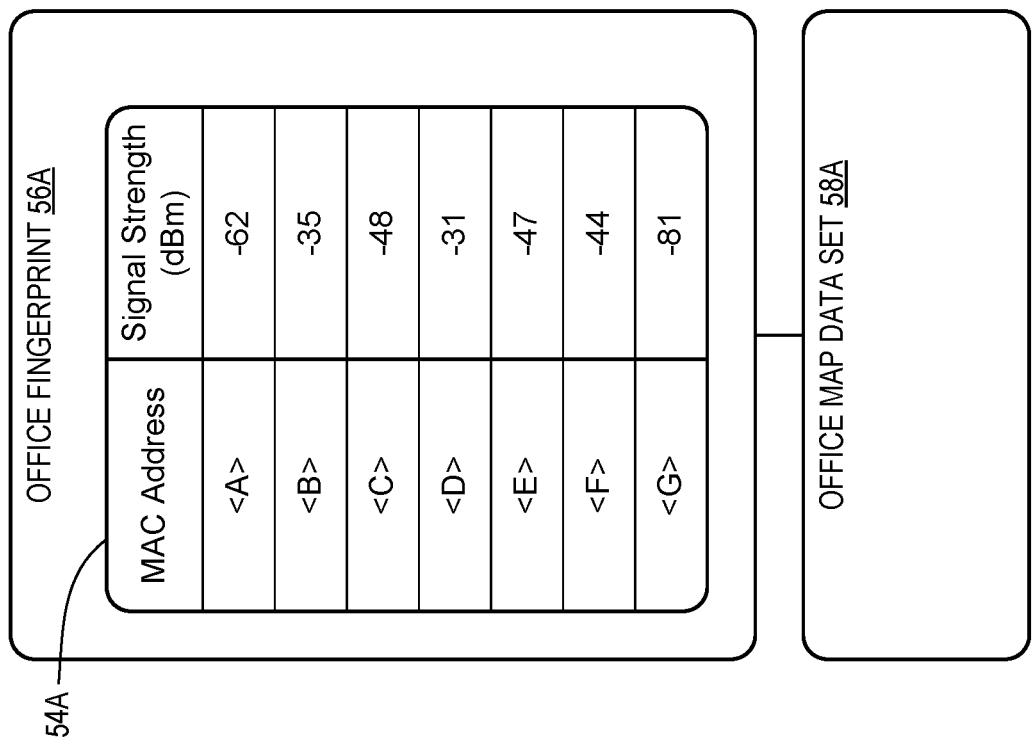

Turning to FIG. 4C, one possible example of fingerprints 56, fingerprint data 54, and map data sets 58 is depicted, in which fingerprints correspond to different, distinct areas in the physical environment, and fingerprint data comprises one or a plurality of vectors. In this example, two different fingerprints are provided for an office environment and a home environment, respectively, and each vector is a pair comprising one MAC address and one signal strength. However, it will be appreciated that SSID may also be used in place of a MAC address. The fingerprint data 54A indicates the MAC addresses and signal strengths of the beacon frame signals that would typically be detected or received by a display device in the office environment. Likewise, fingerprint data 54B indicates the MAC addresses and signal strengths of the beacon frame signals that would typically be received by a display device in the home environment. Each fingerprint is linked to its own corresponding map data set: The office fingerprint 56A is linked to the office map data set 58A, while the home fingerprint 56B is linked to the home map data set 58B. It will be appreciated that the format of the fingerprint data is not particularly limited, and may include just one environment variable (just MAC addresses, just SSIDs, or just signal strengths, for example), or a plurality of environment variables. The fingerprint data may include a mixture of different types of signals, including combinations of cellular signals and Wi-Fi signals, or infrared measurements and Wi-Fi signals, for example. There may be overlaps in fingerprint data from two or more different fingerprint—for example, the office fingerprint 56A and the home fingerprint 56B may contain a beacon frame with the same MAC address (in this example, MAC address <C> is shared by the two fingerprints 56A and 56B). In other embodiments, one common fingerprint may be linked with a plurality of map data sets, and/or one map data set may be linked with a plurality of fingerprints. The fingerprint data 54 may comprise predicted signals that a display device 30 is predicted to detect, or actual signals that have already been detected by display devices and recorded in the server computing device 200.

Returning to FIG. 4A, the client fingerprint program 38 executed by the display device 30 compares the current fingerprint against the fingerprint data 54 retrieved from the server computing device 200, then evaluates and ranks candidate fingerprints in the fingerprint data by proximity to the current fingerprint. In this example, the candidate fingerprints are the office fingerprint 56A and the home fingerprint 56B. The comparison of the current fingerprint against the fingerprint data 54 may be performed one-dimensionally or multi-dimensionally. For example, the evaluation of the candidate fingerprints for proximity or degree of disambiguation to the current fingerprint may proceed one-dimensionally according to just signal source, or multi-dimensionally according to signal source and signal strength. Proximity may be evaluated based on statistical analysis for similarity or degree of disambiguation, and may include confidence values and distance functions with measures of distance. Examples of distance functions include cosine distance functions and $L^n$ distance functions. Examples of measures of distance include Hamming distance and Euclidean distance. Confidence algorithms ranking confidence in decreasing order and/or algorithms of degrees of disambiguation incorporating distance functions may also be applied to evaluate proximity. The current fingerprint and/or fingerprint data may undergo filtering to screen out outliers or remove otherwise unwanted data. For example, client fingerprint program 38 may be configured to filter out data from selected wireless access points, or remove MAC addresses with signal strengths below a predetermined threshold. The client fingerprint program 38 may also impose a cap, or a predetermined upper limit on the number of vectors in a current fingerprint or fingerprint data, permitting a maximum of three vectors in fingerprint data for each fingerprint, for example. User input may also be solicited in the course of the statistical analysis. For example, if multiple candidate fingerprints are within a preset threshold of similarity, with no clear determining factor, user input may be solicited to provide input to disambiguate and select between a plurality of candidate fingerprints before concluding the evaluation of the candidate fingerprints. One example of soliciting user input may be to present the user with two choices: a "high confidence" candidate fingerprint, which has a high enough confidence value to be a reasonable match as determined by a predetermined threshold, and a "similar confidence" candidate fingerprint, which is determined as a second highest match as determined by another predetermined threshold, so that user input would disambiguate between the "high confidence" and "similar confidence" candidate fingerprints.

Subsequent to evaluating the candidate fingerprints for proximity to the current fingerprint, the client fingerprint program 38 makes a determination that one of the candidate fingerprints is the closest match to the current fingerprint, then generates and sends a map data request 48 for the map data set corresponding to the closest matching fingerprint. For example, if the client fingerprint program 38 makes a determination that the office fingerprint 56A is the closest matching fingerprint, the program 38 generates and sends a map data request for the office map data set 58A. The server computing device 200 receives the map data request 48, then retrieves and sends to the display device 30 the office map data set 58A as the matching map data sets 66. The display device 30 receives the office map data set 58A, stitches it into the local map data 36 to create an integrated map, and renders one or a plurality of holograms on the display 20 based on the integrated map.

Figure 5:
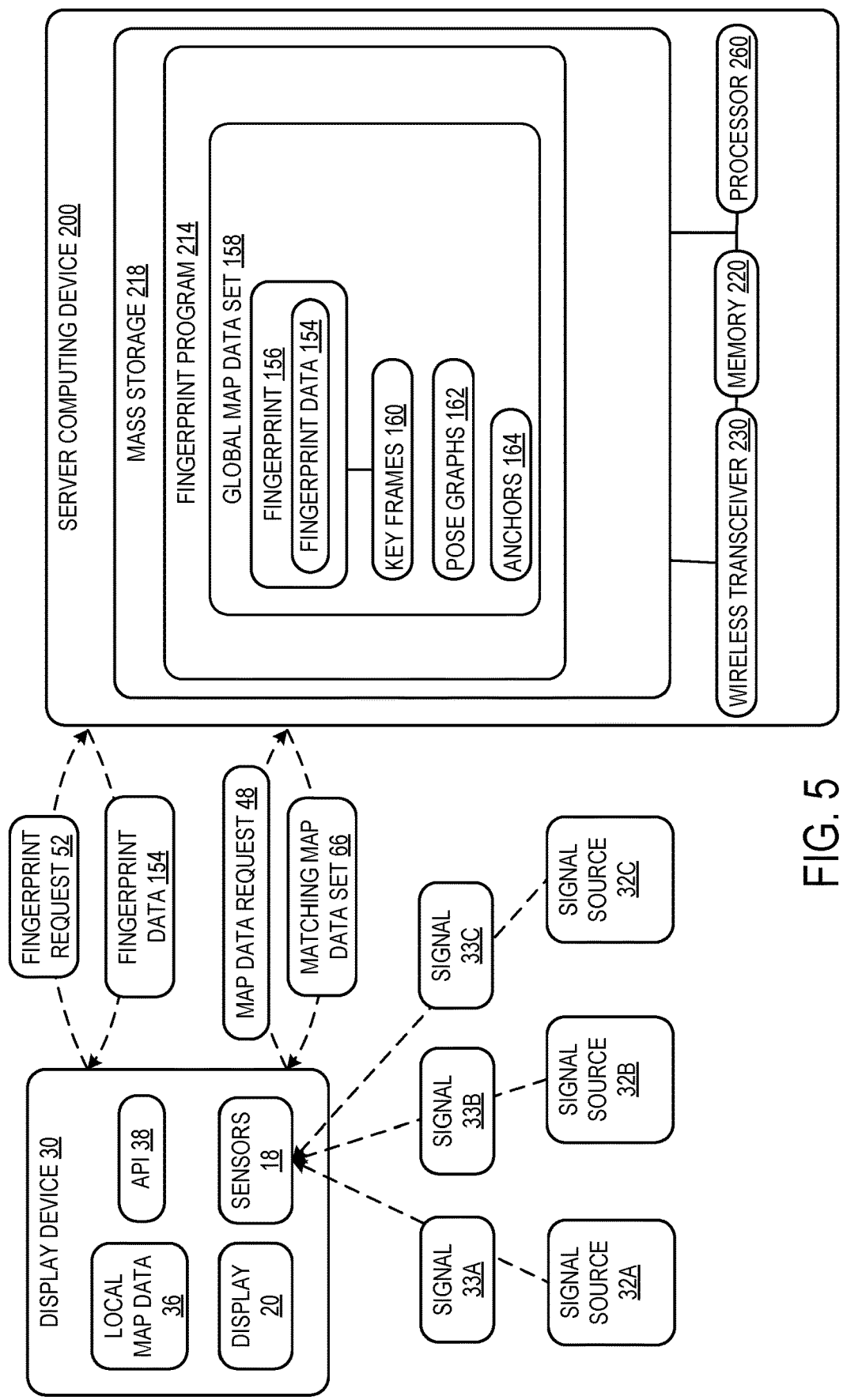
FIG. 5 is a schematic view of a computing device for generating a current fingerprint, comparing the current fingerprint against fingerprint data, and sending a request for a matching map data set according to a second embodiment of the present disclosure.

FIG. 5 is a schematic illustration of a display device generating a current fingerprint and interacting with a server computing device according to a second embodiment of the present disclosure. Since the differences between the embodiments of FIGS. 4A and 5 mainly concern the structural differences in the map data sets, fingerprints, and fingerprint data, the detailed description of the display device 30 and server computing device 200 is abbreviated for the sake of brevity. It is to be noted that like parts are designated by like reference numerals throughout the detailed description and the accompanying drawings. In this embodiment, there is only one unified global map data set 158 representing one unified physical environment encompassing multiple different physical environments, rather than a plurality of different, distinct map data sets for different environments. In some examples, the multiple different physical environments in the global map data set 158 may comprise the entire world. Each fingerprint 156 is linked to its own corresponding keyframe 160 rather than to a corresponding map data set. At least two of the keyframes may be linked to a common fingerprint, especially when the two keyframes are physically close to each other. Accordingly, the client fingerprint program 38 may make a determination that a plurality of candidate fingerprints are the closest match to the current fingerprint, then generate and send a map data request 48 for the map data set or plurality of map data sets within the global map data set 158 corresponding to the identified keyframes linked to the closest matching candidate fingerprints. In some examples, the client fingerprint program 38 may identify a neighborhood surrounding the identified keyframes linked to the closest matching candidate fingerprints, which may include anchors, keyframes, and pose graphs that fall within a predetermined distance of the identified keyframes. However, it will be appreciated that the neighborhood may be arbitrarily defined to encompass any shape or size of three-dimensional space surrounding or proximate to the identified keyframes, including neighborhoods that may not necessarily include at least one of the identified keyframes. One possible embodiment of this neighborhood, in relation to the fingerprints and keyframes, is described in detail below with respect to FIG. 7. The server computing device 200 then sends the one or plurality of matching map data sets 66 corresponding to the identified keyframes to the display device 30 for stitching into the local map data 36.

Figure 6:
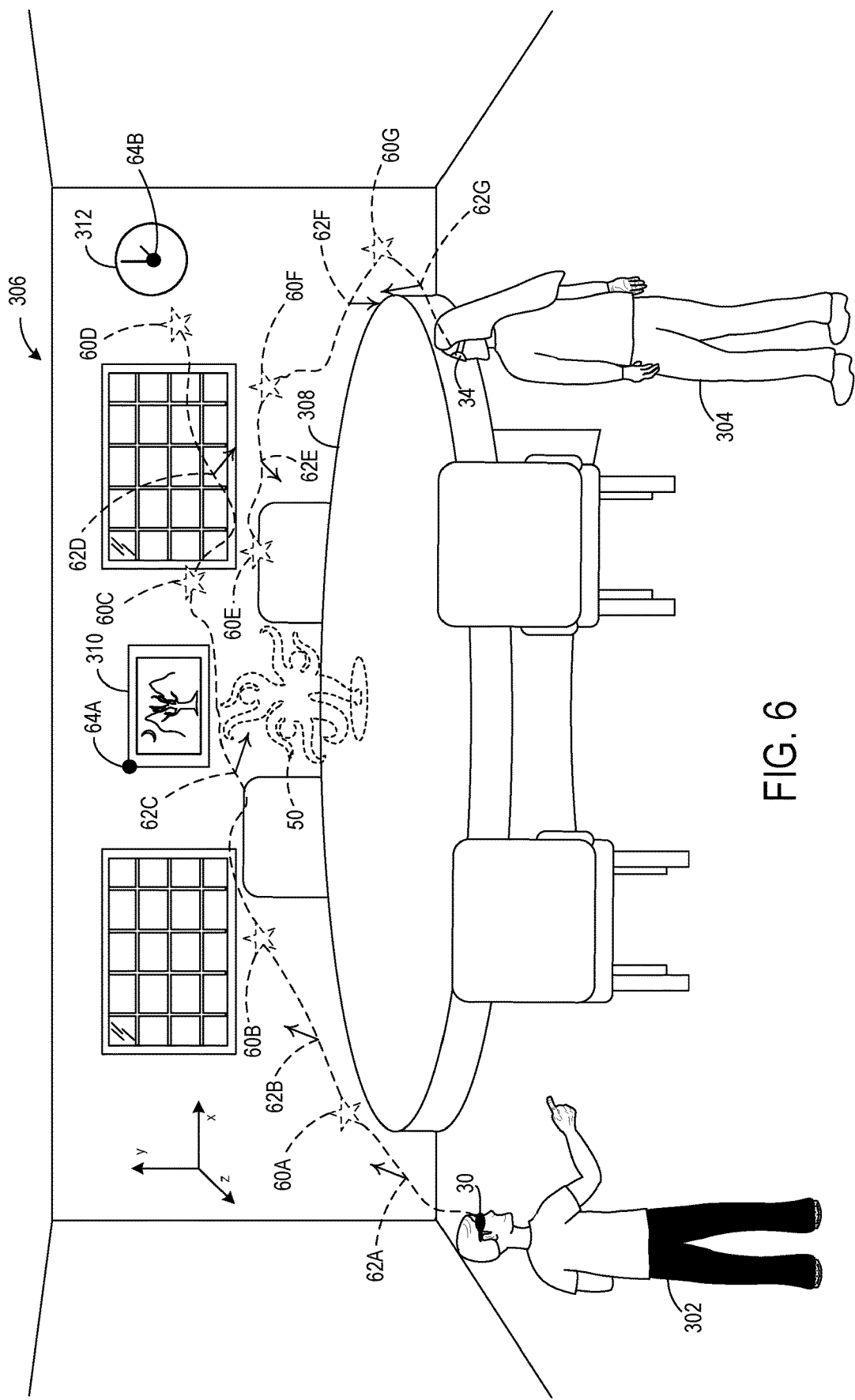
FIG. 6 shows users wearing head-mounted display devices of FIG. 1 in a dining room according to an example of the present disclosure.

With reference to FIG. 6, an example use case illustrating aspects of the present disclosure will now be presented. As schematically shown in FIG. 6, a first user 302 may be standing in a dining room 306 wearing the first display device 30, which in this example may take the form of HMD device shown in FIG. 1. However, it will be appreciated that the display devices are not particularly limited to HMD devices, and may take any form that allows users to view hologram images overlaid upon the real world three-dimensional environment, such as specialized smartphones and tablet devices, autonomous robots, etc. As noted above, first display device 30 (HMD device) and the second display device 34 may comprise an at least partially see-through display configured to visually augment the views of first user 302 and second user 304, respectively, through the display of the real world three-dimensional environment of the dining room 306. The first display device 30 may generate a virtual model of the dining room 306 using a three-dimensional coordinate space overlaid upon the real world dining room. In the example of FIG. 6, such three-dimensional coordinate space is indicated by the x, y, and z axes.

As described in more detail below, the first display device 30 and second display device 34 also may include program logic of a client fingerprint program 38 that retrieves one or a plurality of map data sets of the dining room 306. The map data sets may be structured as keyframes 60 linked by pose graphs 62, and anchors 64 that are associated with the rendering of holograms 50. In this example, a hologram 50 is projected on a table 308 using a target anchor 64A that is on a picture 310. Another neighboring anchor 64B for another hologram is located in a clock 312 that is in the vicinity of the picture 310. The first user 302 and the second user 304 are roaming about the room 306 as they operate the first display device 30 and the second display device 34, respectively, to view the hologram 50 from various angles in the room 306 from their respective vantage points. As the users roam about the room 306, the sensors 18 within the first display device 30 and the second display device 34 capture visual and/or inertial tracking data and thereby track the rotational and translational motion of the display devices through the sensor devices 18, which observe the three-dimensional rotation and translation of the sensor device 18 to be recorded as poses 62A-G and keyframes 60A-G, which are subsequently stored as local map data 36 in the first display device 30 and local map data in the second device 34. The local map data 36 may be transmitted to the server computing device 200 to be stored in mass storage 218 of the server computing device 200 and later retrieved as one or a plurality of matching map data sets 66 if the map data sets correspond to the one or the plurality of closest matching fingerprints that are indicated by the map data request 48. The poses 62A-G and keyframes 60A-G are described in more detail with respect to FIG. 7. The display devices 30 and 34 subsequently use the retrieved matching map data sets 66 to orient and locate themselves and determine more precise locations of themselves relative to the physical environment of the dining room 306.

Figure 7:
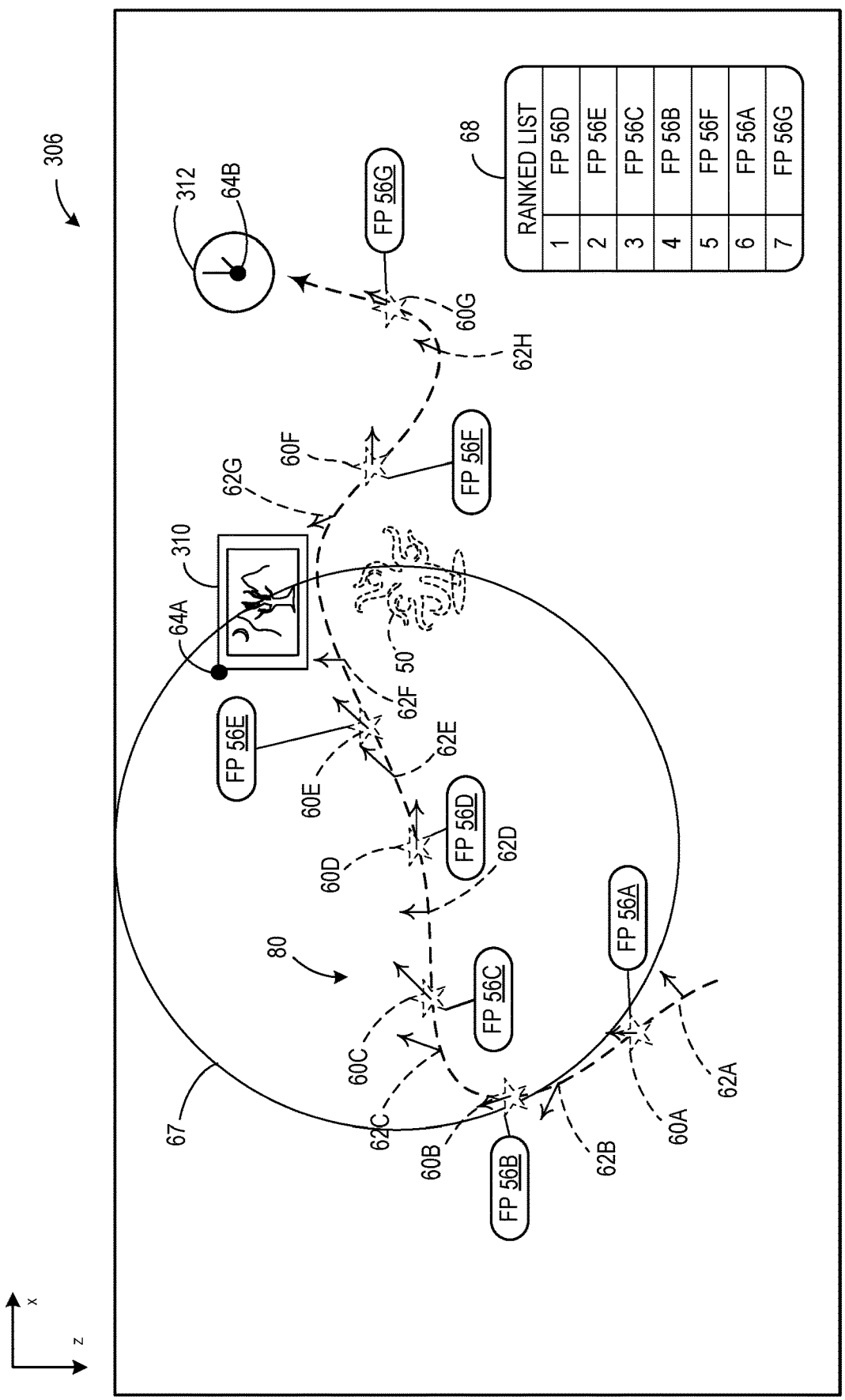
FIG. 7 is a schematic view of one embodiment of map data including a corresponding map data set according to the second embodiment of the present disclosure.

Turning to FIG. 7, one possible embodiment of the map data applied in the present disclosure is discussed in more detail. The information for the map data may be generated by at least a sensor device in a plurality of display devices sending sensor data, including the rotational and translational motion tracked by the sensor device, to the computing device 200 in sets that are configured as keyframes 60A-G and a pose graph 80 linking poses 62A-H. Here, a display device and its keyframes and pose graphs are depicted, but other embodiments may feature two or more display devices in close proximity to each other, each with their own trajectories of key frames and pose graphs. Also contained in the map data are a plurality of virtual place-located anchors 64, including the target anchor 64A and a neighboring anchor 64B at world-locked virtual locations with known three-dimensional coordinates in the physical environment. These anchors may include visibly conspicuous features in the physical environment, such as the picture 310 and clock 312 illustrated in FIG. 6. Poses 62A-H, depicted as small arrows in the pose graph 80, are typically unit vectors that point in the direction of a fixed straight-ahead gaze out of the display of display device, as described above, and the pose graphs record the position of the poses in three-dimensional space over time. Individual keyframes 60A-G are linked to each other in pose graph 80, which links poses 62A-H. The pose graph thus includes a plurality of such poses linked to each other in a directed graph so as to track the changes in pose as the display device travels through the three-dimensional coordinate space of the physical environment. The pose graph 80 forms a linear trajectory of map data that the display device leaves behind to store as local map data and subsequently sends to the server computing device 200 for compilation and analysis as map data as the display device travels through three-dimensional coordinate space over time.

Keyframes 60A-G contain sets of information that can be used to improve the ability of the display device to ascertain its location, and thus help render holograms in stable locations. As discussed above, examples of data included in keyframes 60A-G include metadata, observations and patches, and/or image feature descriptors. Metadata may include the extrinsic data of the camera, the time when keyframe was taken, gravity data, temperature data, magnetic data, calibration data, global positioning data, etc. Observations and patches may provide information regarding detected feature points in a captured image, such as corners and high contrast color changes that help correct the estimation of the position and orientation of the display device, and accordingly help better align and position the display of a holographic image via display 20 in three-dimensional space. Image feature descriptors may be feature points, sometimes efficiently represented in a small data set, in some examples as small as 32 bytes, that are used the feature matching engine 13 described above to quickly recognize features in the real time captured images 118A and depth images 121A, to accurately estimate the position of the display device, and thus accurately render the hologram on the map of the physical environment.

Pose graph 80 interlinking the keyframes may be a plurality of continuously connected poses communicating how much rotation and translation in three-dimensional space the display device undergoes between keyframes over time. Multiple anchors may be interlinked with each other via poses 62A-H. It will be appreciated that, the geometric relationship between a display device and a hologram for a given keyframe may be computed by first computing the distance between the current pose of the device and the anchor associated with the hologram, and then computing the distance between the anchor and the hologram itself.

In FIG. 7, the client fingerprint program 38 evaluates the candidate fingerprints 56A-G for proximity or degree of disambiguation to the current fingerprint, generating a ranked list 68 of the candidate fingerprints 56A-G by proximity or degree of disambiguation to the current fingerprint based on statistical analysis. In this example, the first seven closest candidate fingerprints are included in the ranked list 68, but the number of fingerprints included in the ranked list 68 is not particularly limited, and may include one or a plurality of candidate fingerprints. Subsequent to the evaluation for proximity or degree of disambiguation, the client fingerprint program 38 makes a determination that a plurality of candidate fingerprints in the ranked list 68 are the closest match to the current fingerprint, and then generates and sends a map data request for the map data set or plurality of map data sets within the global map data set 158 corresponding to the identified keyframes linked to the closest matching candidate fingerprints. In this example, the client fingerprint program 38 has identified a neighborhood 67 surrounding the identified keyframe 60D linked to the closest matching candidate fingerprint 56D. Alternatively, the client fingerprint program 38 may identify a neighborhood surround a plurality of identified keyframes 60D and 60E linked to the closest matching candidate fingerprints 56D and 56E, respectively. In this example, this neighborhood 67 includes an anchor 64A, keyframes 60B-E, and poses 62C-F that fall within a predetermined distance of the identified keyframe 60D linked to the closest matching fingerprint 56D, and the neighborhood 67 is retrieved and sent to the display device 30 as a matching map data sets 66.

However, it will be appreciated that the neighborhood 67 may alternatively be arbitrarily defined to encompass any shape or size of three-dimensional space surrounding or proximate to the identified keyframes, including neighborhoods that may not necessarily include at least one of the identified keyframes. The matching map data sets 66 may further include instructions of a ranking order by which the keyframes are loaded into the display device 30. For example, the instructions may instruct the display device 30 to load the keyframes 60D, 60E, 60C, 60B, 60F, 60A, and 60G, in this order by the ranking order of the fingerprints 56D, 56E, 56C, 56B, 56F, 56A, and 56G, respectively. Alternatively, if a plurality of matching map data sets are sent to the display device 30, the instructions may include a ranking order by which the individual map data sets are to be loaded into memory of the display device 30. This ranking order of the fingerprints or map data sets may also be used by the display device 30 to determine the order by which keyframes or map data sets are discarded or evicted when the display device 30 encounters memory constraints as the display device 30 keeps incorporating new map data sets. In the example, the display device 30 will discard keyframes 60G, 60A, 60F, 60B, 60C, 60E, and 60D, in this order, when the display device 30 empties its memory of old map data sets. It will be appreciated that the ranking order of the fingerprints may also be used to determine the order by which other sets of data, such as pose graphs and anchors, are evicted from the memory of the display device 30.

Figure 8A:
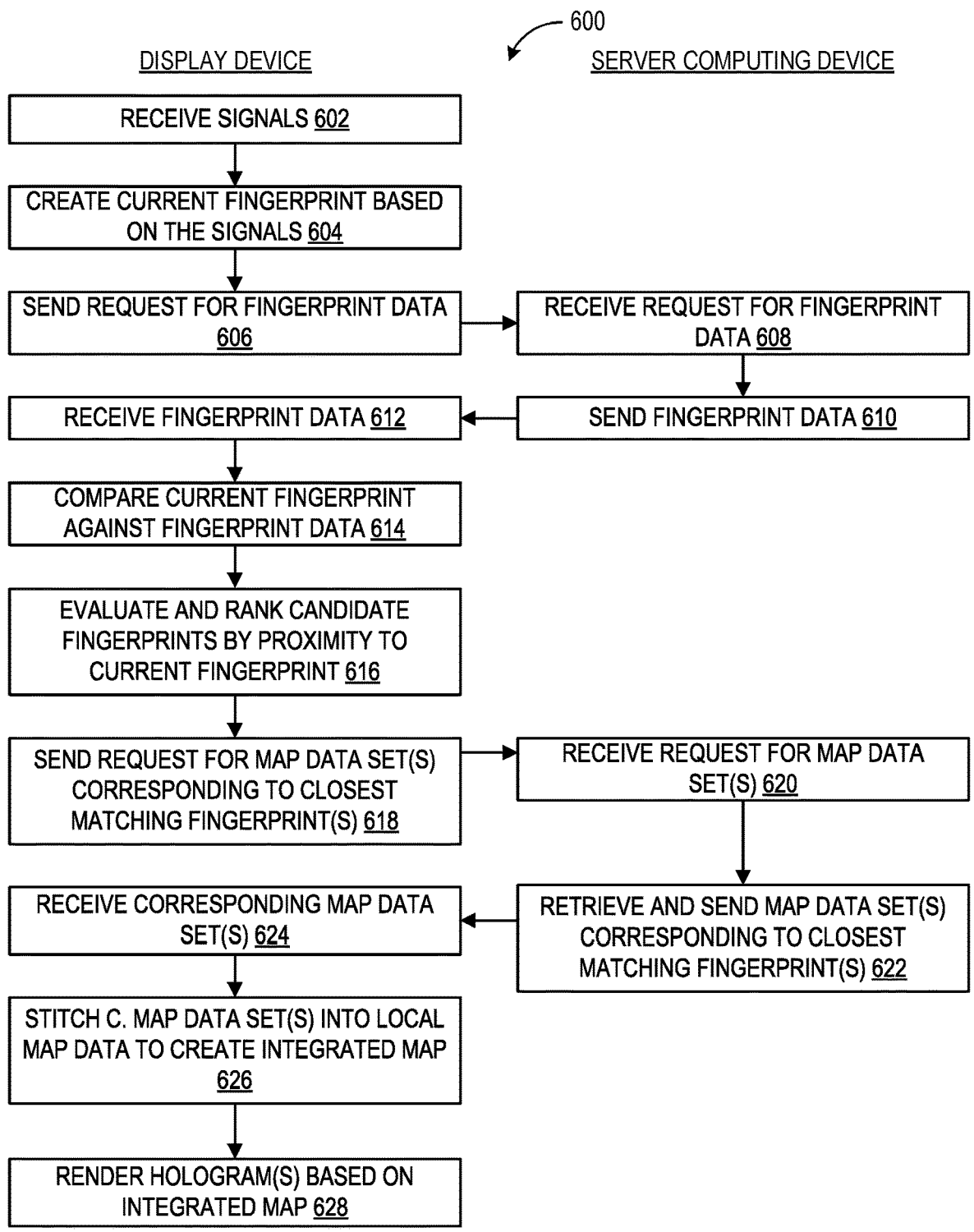
FIGS. 8A, 8B and 8C are flow charts of a method of generating a current fingerprint and retrieving corresponding map data sets according to three examples of the present disclosure.

FIG. 8A illustrates a flow chart of a first configuration of a method 600 for performing coarse localization according to an example of the present disclosure. The following description of method 600 is provided with reference to the software and hardware components described above and shown in FIGS. 1-7. It will be appreciated that method 600 also may be performed in other contexts using other suitable hardware and software components.

With reference to FIG. 8A, at 602 the method 600 may include the sensors of the display device receiving signals from one or more signal sources, such as wireless access points. At 604 the display device generates a current fingerprint based on the received signals. At 606 the display device sends a request to the server computing device for fingerprint data. At 608 the server computing device receives the request for fingerprint data. At 610 the server computing device sends the fingerprint data to the display device. At 612 the display device receives the fingerprint data from the server computing device. At 614 the display device compares the current fingerprint against the fingerprint data. At 616 the display device evaluates and ranks candidate fingerprints in the fingerprint data by proximity to the current fingerprint. At 618 the display device sends a request for the one or the plurality of map data sets corresponding to the one or the plurality of closest matching fingerprints. At 620 the server computing device receives the request for the one or plurality of map data sets corresponding to the one or the plurality of closest matching fingerprints. At 622 the server computing device retrieves and sends to the display device the one or the plurality of map data sets corresponding to the one or the plurality of closest matching fingerprints. At 624 the display device receives the one or the plurality of corresponding map data sets. At 626 the display device stitches the corresponding map data sets into the local map data to create an integrated map. At 628 the display device renders one or a plurality of holograms based on the integrated map.

Figure 8B:
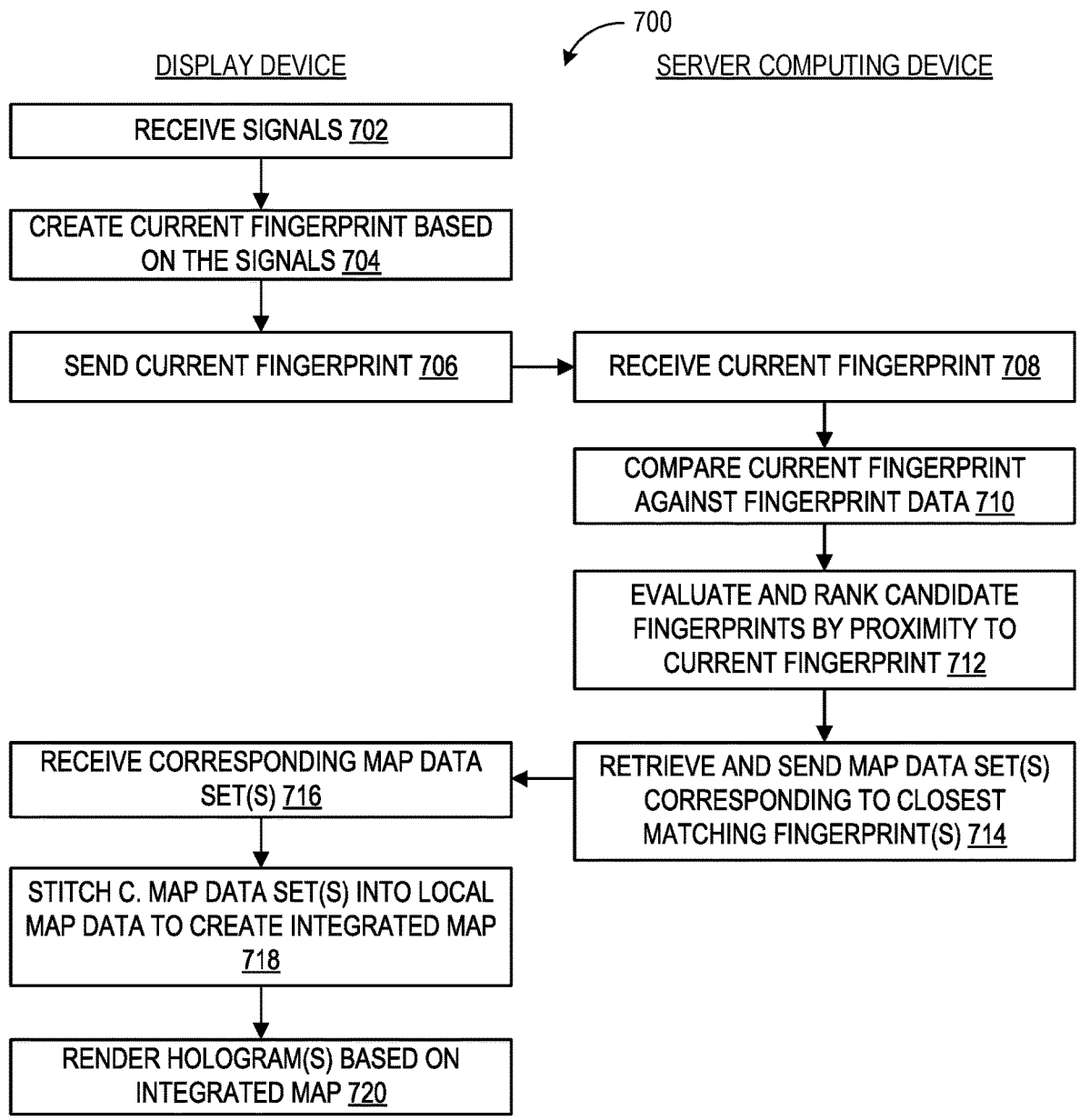

FIG. 8B illustrates a flow chart of a second configuration of a method 700 for performing coarse localization according to an example of the present disclosure. The following description of method 700 is provided with reference to the software and hardware components described above and shown in FIGS. 1-7. It will be appreciated that method 700 also may be performed in other contexts using other suitable hardware and software components.

With reference to FIG. 8B, at 702 the method 700 may include the sensors of the display device receiving signals from one or more signal sources, such as wireless access points. At 704 the display device generates a current fingerprint based on the received signals. At 706 the display device sends a request to the server computing device for fingerprint data. At 708 the server computing device receives the request for fingerprint data. At 710 the server computing device compares the current fingerprint against the fingerprint data. At 712 the server computing device evaluates and ranks candidate fingerprints in the fingerprint data by proximity to the current fingerprint. At 714 the server computing device retrieves and sends to the display device the one or the plurality of map data sets corresponding to the one or the plurality of closest matching fingerprints. At 716 the display device receives the one or the plurality of corresponding map data sets. At 718 the display device stitches the corresponding map data sets into the local map data to create an integrated map. At 720 the display device renders one or a plurality of holograms based on the integrated map.

Figure 8C:
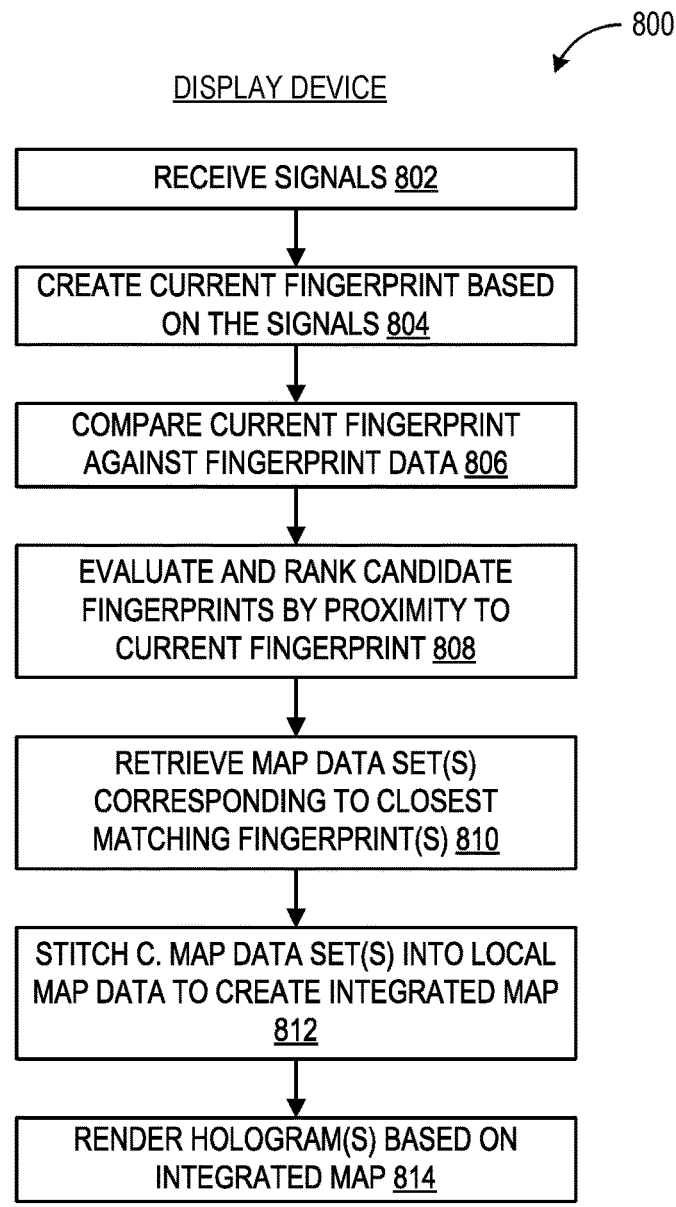

FIG. 8C illustrates a flow chart of a third configuration of a method 800 for performing coarse localization according to an example of the present disclosure. The following description of method 800 is provided with reference to the software and hardware components described above and shown in FIGS. 1-7. It will be appreciated that method 800 also may be performed in other contexts using other suitable hardware and software components.

With reference to FIG. 8C, at 802 the method 800 may include the sensors of the display device receiving signals from one or more signal sources. At 804 the display device generates a current fingerprint based on the received signals. At 806 the display device compares the current fingerprint against the fingerprint data. At 808 the display device evaluates and ranks candidate fingerprints in the fingerprint data by proximity to the current fingerprint. At 810 the display device retrieves the one or the plurality of map data sets corresponding to the one or the plurality of closest matching fingerprints. At 812 the display device stitches the corresponding map data sets into the local map data to create an integrated map. At 814 the display device renders one or a plurality of holograms based on the integrated map.

It will be appreciated that methods 600, 700, and 800 are provided by way of example and is not meant to be limiting. Therefore, it is to be understood that methods 600, 700, and 800 may include additional and/or alternative steps relative to those illustrated in FIGS. 8A, 8B and 8C. Further, it is to be understood that methods 600, 700, and 800 may be performed in any suitable order. Further still, it is to be understood that one or more steps may be omitted from methods 600, 700, and 800 without departing from the scope of this disclosure. For example, the comparison of the current fingerprint against fingerprint data and the evaluation and ranking of the candidate fingerprints may be performed by the display device, the server computing device, or another computing device. Further, the stitching of the corresponding map data sets into the local map data may alternatively be performed by the server computing device or another computing device. The map data sets to be retrieved may be stored in the display device, the server computing device, or another computing device.

In summary, when a display device retrieves one or a plurality of map data sets to orient and locate itself, it generates a current fingerprint using signal data detected by sensors in the display device. This current fingerprint is compared against existing fingerprint data and statistically analyzed for proximity or degree of disambiguation to candidate fingerprints of the fingerprint data. A ranked list of closest matching fingerprints is generated, and map data corresponding to the closest matching fingerprints is subsequently sent to the display device so that the display device may efficiently load the map data and incorporate it into the local map data stored in the display device memory to efficiently locate and orient itself in the physical environment. Then as 6-DoF tracking continues to run on the display device to leave behind a trajectory of linear map data that is stored as local map data, the device may discard or evict the map data based on a reverse order of the ranked list of the closest matching fingerprints.

Accordingly, the coarse relocalization step is accelerated so that the display device can more quickly and reliably orient and locate itself relative to its surrounding physical environment, allowing users to physically move between different environments with ease and automatically adapt discovered relevant map data for the new environment. Memory requirements of the display device are also reduced so that larger environment data can be incrementally loaded without adversely affecting the user experience. A variety of statistical analysis tools can be applied to optimize for different scenarios, calibrating to favor load speeds or lower memory requirements, for example. A variety of existing map data formats can be implemented to retain the flexibility of keyframe-based map data, which allows flexible adjustments in sampling distance, for example.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
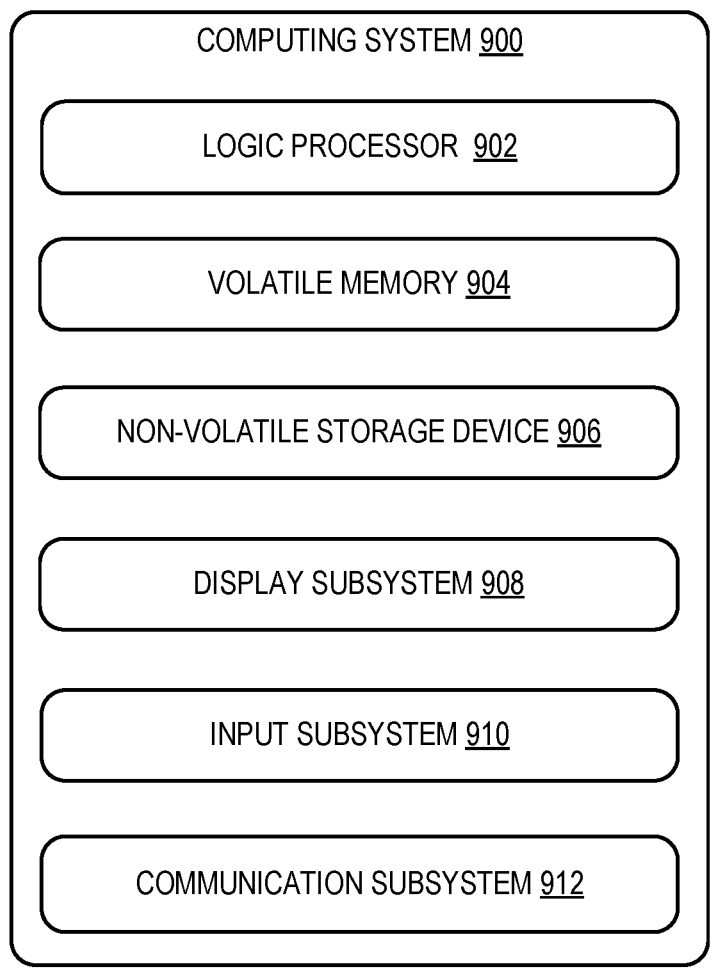
FIG. 9 shows a computing system according to an embodiment of the present disclosure.

FIG. 9 schematically shows a non-limiting embodiment of a computing system 900 that can enact one or more of the methods and processes described above. Computing system 900 is shown in simplified form. Computing system 900 may embody the computing device 10 of FIG. 1 or the server computing device 200 of FIGS. 4A and 5. Computing system 900 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 900 includes a logic processor 902 volatile memory 904, and a non-volatile storage device 906. Computing system 900 may optionally include a display subsystem 908, input subsystem 910, communication subsystem 912, and/or other components not shown in FIG. 9.

Logic processor 902 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 902 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 906 includes one or more physical devices configured to hold instructions executable by the logic processors to implement the methods and processes described herein. When such methods and processes are implemented, the state of non-volatile storage device 906 may be transformed—e.g., to hold different data.

Non-volatile storage device 906 may include physical devices that are removable and/or built-in. Non-volatile storage device 906 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 906 may include nonvolatile, dynamic, static, read/write, read-only, sequential-access, location-addressable, file-addressable, and/or content-addressable devices. It will be appreciated that non-volatile storage device 906 is configured to hold instructions even when power is cut to the non-volatile storage device 906.

Volatile memory 904 may include physical devices that include random access memory. Volatile memory 904 is typically utilized by logic processor 902 to temporarily store information during processing of software instructions. It will be appreciated that volatile memory 904 typically does not continue to store instructions when power is cut to the volatile memory 904.

Aspects of logic processor 902, volatile memory 904, and non-volatile storage device 906 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 900 typically implemented in software by a processor to perform a particular function using portions of volatile memory, which function involves transformative processing that specially configures the processor to perform the function. Thus, a module, program, or engine may be instantiated via logic processor 902 executing instructions held by non-volatile storage device 906, using portions of volatile memory 904. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 908 may be used to present a visual representation of data held by non-volatile storage device 906. The visual representation may take the form of a graphical user interface (GUI). As the herein described methods and processes change the data held by the non-volatile storage device, and thus transform the state of the non-volatile storage device, the state of display subsystem 908 may likewise be transformed to visually represent changes in the underlying data. Display subsystem 908 may include one or more display devices utilizing virtually any type of technology. Such display devices may be combined with logic processor 902, volatile memory 904, and/or non-volatile storage device 906 in a shared enclosure, or such display devices may be peripheral display devices.

When included, input subsystem 910 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 912 may be configured to communicatively couple various computing devices described herein with each other, and with other devices. Communication subsystem 912 may include wired and/or wireless communication devices compatible with one or more different communication protocols. As non-limiting examples, the communication subsystem may be configured for communication via a wireless telephone network, or a wired or wireless local- or wide-area network, such as Bluetooth and HDMI over Wi-Fi connection. In some embodiments, the communication subsystem may allow computing system 900 to send and/or receive messages to and/or from other devices via a network such as the Internet.

Figure 10:
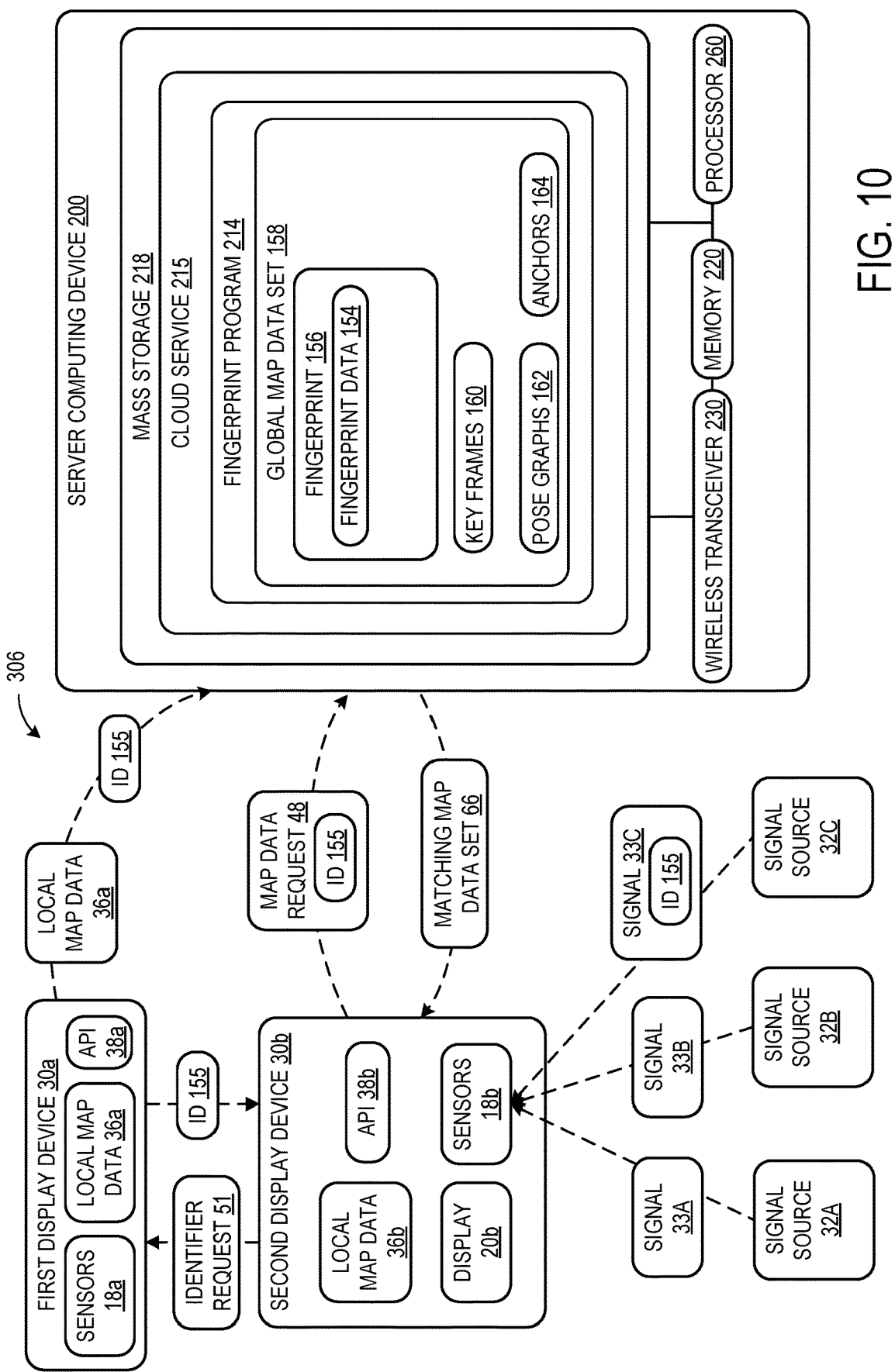
FIG. 10 is a schematic view of a computing device for obtaining a session-specific identifier, and sending a request for a matching map data set using the session-specific identifier according to a third embodiment of the present disclosure.

FIG. 10 is a schematic illustration of a display device obtaining a session-specific identifier and interacting with a cloud service of a server computing device according to a third embodiment of the present disclosure. Since the differences between the embodiments of FIGS. 5 and 10 mainly concern the difference in the way the display device requests map data from the server computing device, the detailed description of the display devices 30a and 30b and server computing device 200 is abbreviated for the sake of brevity. It is to be noted that like parts are designated by like reference numerals throughout the detailed description and the accompanying drawings. In this example, the first display device 30a captures visual and/or inertial tracking data and thereby tracks the rotational and translational motion of the display device 30a through the sensor devices 18a, which observe the three-dimensional rotation and translation of the sensor devices 18a to be recorded as poses and keyframes, which are subsequently stored as local map data 36a in the first display device 30a. The first display device 30a also generates a session-specific identifier 155 that is associated with the local map data 36a. The first display device 30a then transmits the session-specific identifier 155 and the local map data 36a to the server computing device 200 to be stored in the mass storage 218 of the server computing device 200 and later retrieved as one or a plurality of matching map data sets 66 if the map data sets correspond to the session-specific identifier 155 that is indicated by the map data request 48. The corresponding map data may comprise neighboring map data of a neighborhood around one or a plurality of keyframes linked to the session-specific identifier 155.

The session-specific identifier 155 is an identifier associated with a predetermined session. The session-specific identifier 155 may be a unique code, or a temporary non-unique code that is effective only for the duration of a predetermined session, for example. The session-specific identifier 155 may be based on the beacon frames of the wireless signals 33A-C broadcasted by one or the plurality of wireless access points 32A-C. It will be appreciated that the session-specific identifier 155 is not limited to a MAC address, and may be based on one or more features within a beacon frame of the wireless signals 33A-C. The session-specific identifier 155 may indicate a specific class of devices, such as augmented reality devices. It will be appreciated that the session-specific identifier 155 preferably contains no private information of users of the first display device 30a or the second display device 30b, so as to protect the privacy of the personal data of the users.

In this embodiment, first display device 30a is a device that has entered environment 306 prior to second display device 30b. As second display device 30b enters the environment 306, the second display device 30b starts a process of orienting itself by obtaining the local map data 36b corresponding to the new environment 306. The second display device 30b may transmit an identifier request 51 to surrounding display devices such as first display device 30a to determine if there are other devices that are subscribed to the same remote system 215, and thus can access the server fingerprint program 214 of the remote system 215 of the server computing device 200. The transmission of the identifier request 51, which may include an identifier that is recognized by the client fingerprint program 38a of the first display device 30a as a request, may be performed with low energy beacons, such as BLUETOOTH® beacons, to detect nearby devices in close physical proximity to the second display device 30b. WIFI beacon frames may also be used. The client fingerprint program 38a executed by the first display device 30a and the client fingerprint program 38b executed by the second display device 30b are configured to use the same cloud service 215, which includes a server fingerprint program 214 hosted on the server computing device 200. Accordingly, the client fingerprint program 38a and client fingerprint program 38b are both configured to recognize an identifier request 51 and a session-specific identifier 155, since these parameters are defined according to a schema known to each client fingerprint program 38a, 38b and the cloud service 215, and communicated therebetween.

It will be appreciated that the server computing device 200 may take the form of a server, networking computer, gaming console, mobile communication device, edge computing device, desktop computer, laptop computer, tablet computer, set-top box (e.g. cable television box, satellite television box), or any other type of suitable computing device that is configured to execute server software that responds to requests from clients. In some examples, the server computing device 200 may be an embedded system within a larger electronic or mechanical device or system.

It will be appreciated that the remote system 215 (hereinafter described as a cloud service) is not particularly limited, and may be a private, public, hybrid, or community cloud service, on-premises or off-premises, that is accessible by both the first display device 30a and the second display device 30b. When the cloud service 215 is configured as private cloud that is operated solely for an organization, the localization of the second display device 30b that is based on the session-specific identifier 155 can be enabled, while still allowing the organization to maintain total control over all data generated between the display devices 30a and 30b and the server computing device 200. When the cloud service 215 is configured as a public cloud that is made available to the general public or a large industry group, it will be appreciated that additional data security infrastructure may be deployed to maintain control over the data generated between the server computing device 200 and multiple display devices of the general public operating within the environment 306.

The first display device 30a detects or receives the identifier request 51. In response, the first display device 30a transmits the session-specific identifier 155 to the second display device 30b. The second display device 30b receives the session-specific identifier 155 from the first display device 30a. Responsive to receiving the session-specific identifier 155 from the first display device 30a, the second display device 30b transmits a map data request 48 containing the session-specific identifier 155 to the cloud service 215 of the server computing device 200, requesting the map data set within the global map data set 158 corresponding to the session-specific identifier 155. The server computing device 200 receives the map data request 48 containing the session-specific identifier 155, then retrieves and sends to the second display device 30b a matching map data set corresponding to the session-specific identifier 155 as the matching map data set 66. The second display device 30b receives from the cloud service 215 the matching map data set 66 corresponding to the session-specific identifier 155. The second display device 30b then stitches the corresponding matching map data set 66 into the local map data 36b to create an integrated map. The second display device 30b then renders one or a plurality of holograms based on the integrated map, causing the display of the second display device 30b to display one or more holograms based on the retrieved map data set 66 corresponding to the session-specific identifier 155. As discussed above, the type of retrieved map data set 66 will be understood to be any set of data that correlate points in the three-dimensional coordinate space in the physical environment to information that help orient and locate the display device in the three-dimensional space. As described in FIGS. 6 and 7, the retrieved map data set 66 may include keyframes 60, pose graphs 62, and anchors 64 in the form of anchor data. In some embodiments, it will be appreciated that the retrieved map data set 66 may not include keyframes 60, pose graphs 62, or anchors 64; instead the retrieved map data set 66 may include positional data for one or more holograms associated with anchors in the matching map data set 66 corresponding to the session-specific identifier 155. In accordance with this configuration, by retrieving map data set 66 corresponding to the session-specific identifier 155, memory requirements of the second display device are also reduced so that larger environment data can be incrementally loaded without adversely affecting the user experience, and load times can be shortened by taking advantage of near field communication between devices to simplify the sharing of map data or hologram positional data.

Figure 11A:
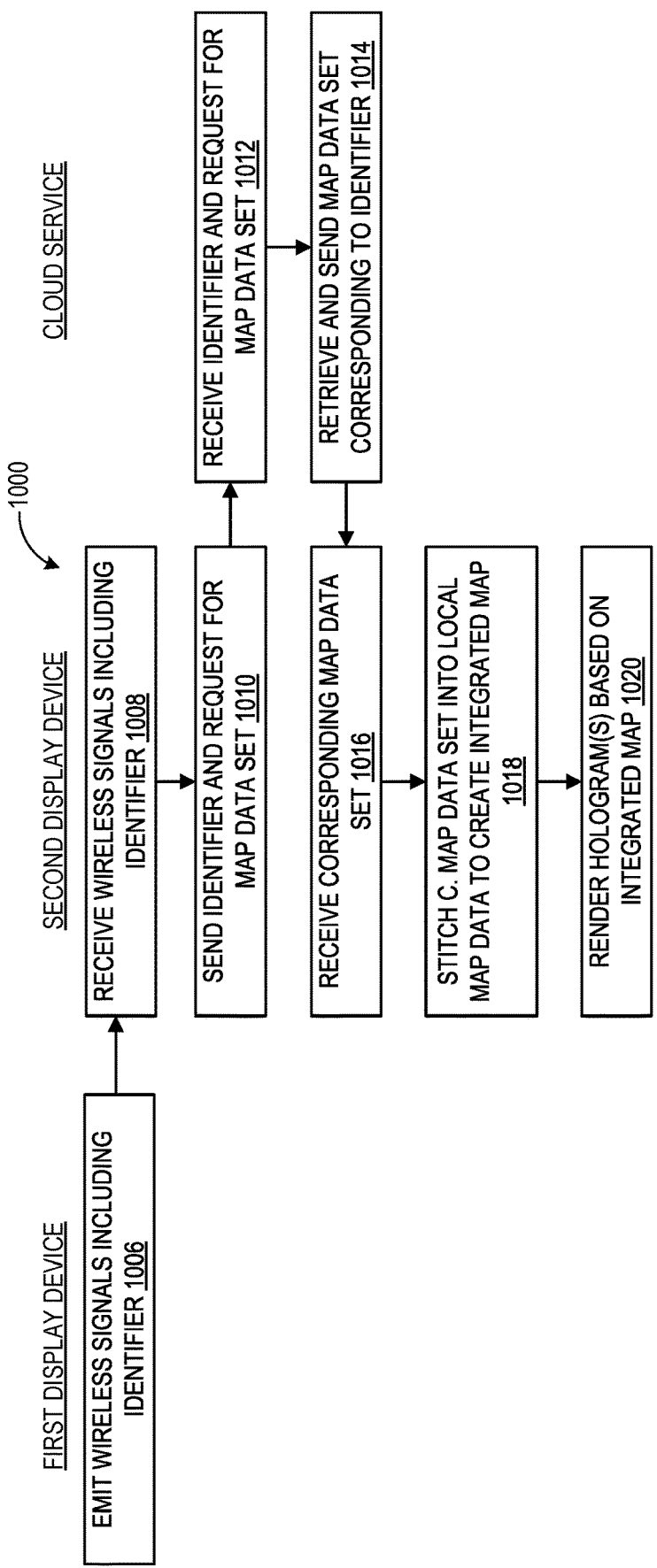
FIGS. 11A, 11B, 11C, and 11D are flow charts of methods of obtaining a session-specific identifier and retrieving corresponding map data sets according to four examples of the present disclosure.

Referring to FIG. 11A, a flow chart is illustrated of a fourth configuration of a method 1000 for performing coarse localization according to an example of the present disclosure. The following description of method 1000 is provided with reference to the software and hardware components described above and shown in FIGS. 1-7. It will be appreciated that method 1000 also may be performed in other contexts using other suitable hardware and software components. Although only two display devices are depicted in this flow chart, it will be appreciated that method 1000 can also be applied to multiple pairs of devices in an environment including several devices subscribed or registered to the same cloud service.

With reference to FIG. 11A, at 1006, the first display device emits wireless signals including a session-specific identifier. At 1008, the second display device receives the wireless signals including the session-specific identifier which corresponds to a map data set. At 1010, the second display device sends the session-specific identifier and a request for a map data set to the cloud service. At 1012, the cloud service receives the session-specific identifier and the map data request from the second display device. At 1014, responsive to receiving the session-specific identifier and the map data request, the cloud service retrieves and sends the map data set corresponding to the session-specific identifier to the second display device. At 1016, the second display device receives the map data set corresponding to the session-specific identifier. At 1018, the second display device stitches the corresponding map data set into the local map data to create an integrated map. At 1020, the second display device renders one or a plurality of holograms based on the integrated map.

Figure 11B:
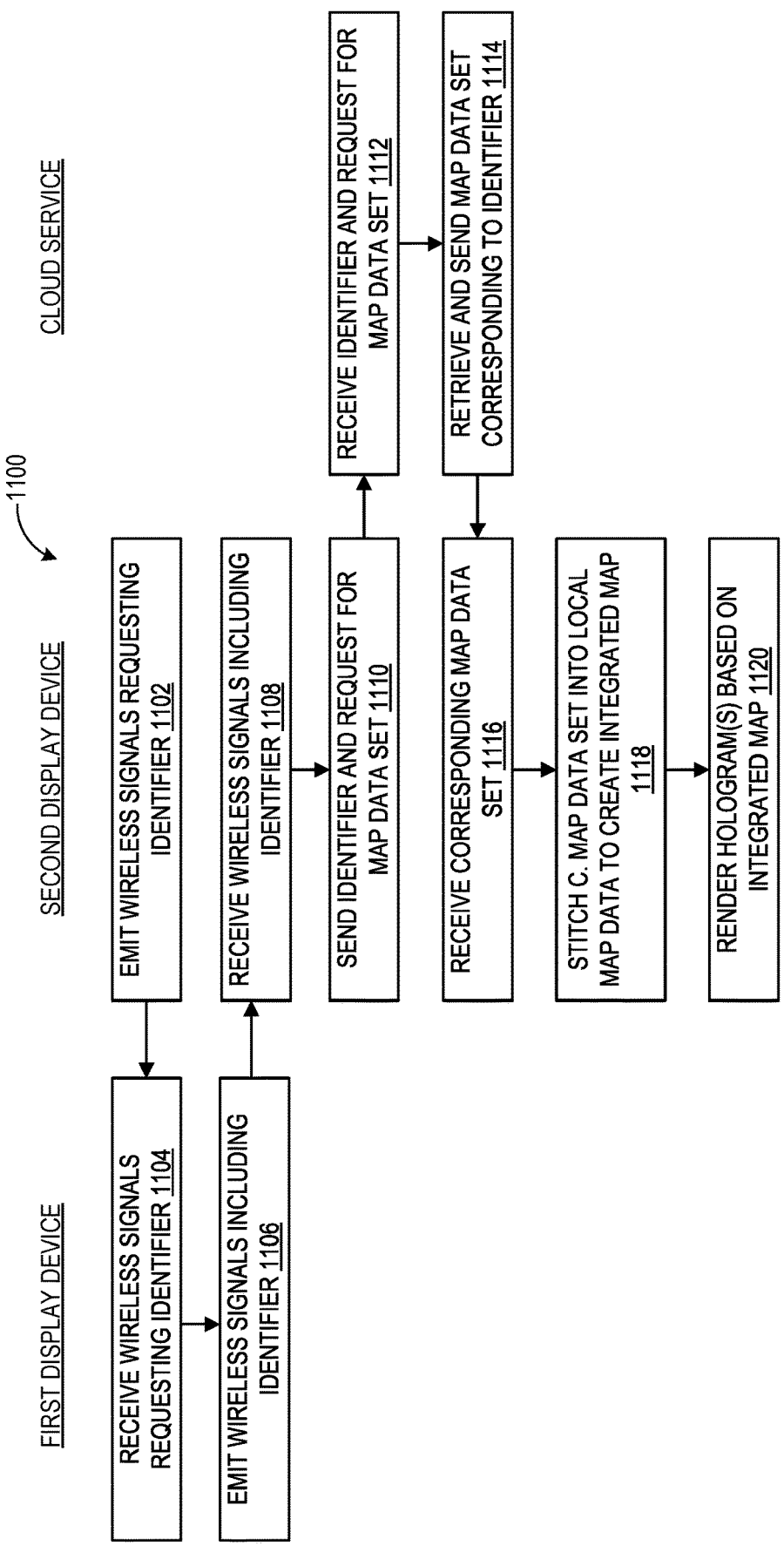

Referring to FIG. 11B, a flow chart is illustrated of a fifth configuration of a method 1100 for performing coarse localization according to an example of the present disclosure. The following description of method 1100 is provided with reference to the software and hardware components described above and shown in FIGS. 1-7. It will be appreciated that method 1100 also may be performed in other contexts using other suitable hardware and software components. Although only two display devices are depicted in this flow chart, it will be appreciated that method 1100 can also be applied to multiple pairs of devices in an environment including several devices subscribed or registered to the same cloud service.

With reference to FIG. 11B, at 1102 the second display device emits wireless signals requesting a session-specific identifier. At 1104 the first display device receives the second display device's request for a session-specific identifier. At 1106, the first display device emits wireless signals including a session-specific identifier. At 1108, the second display device receives from the first display device the wireless signals including the session-specific identifier which corresponds to a map data set. At 1110, the second display device sends the session-specific identifier and a request for the map data set to the cloud service. At 1112, the cloud service receives the session-specific identifier and the map data request from the second display device. At 1114, responsive to receiving the session-specific identifier and the map data request, the cloud service retrieves and sends the map data set corresponding to the session-specific identifier to the second display device. At 1116, the second display device receives the map data set corresponding to the session-specific identifier. At 1118, the second display device stitches the corresponding map data set into the local map data to create an integrated map. At 1120, the second display device renders one or a plurality of holograms based on the integrated map.

Figure 11C:
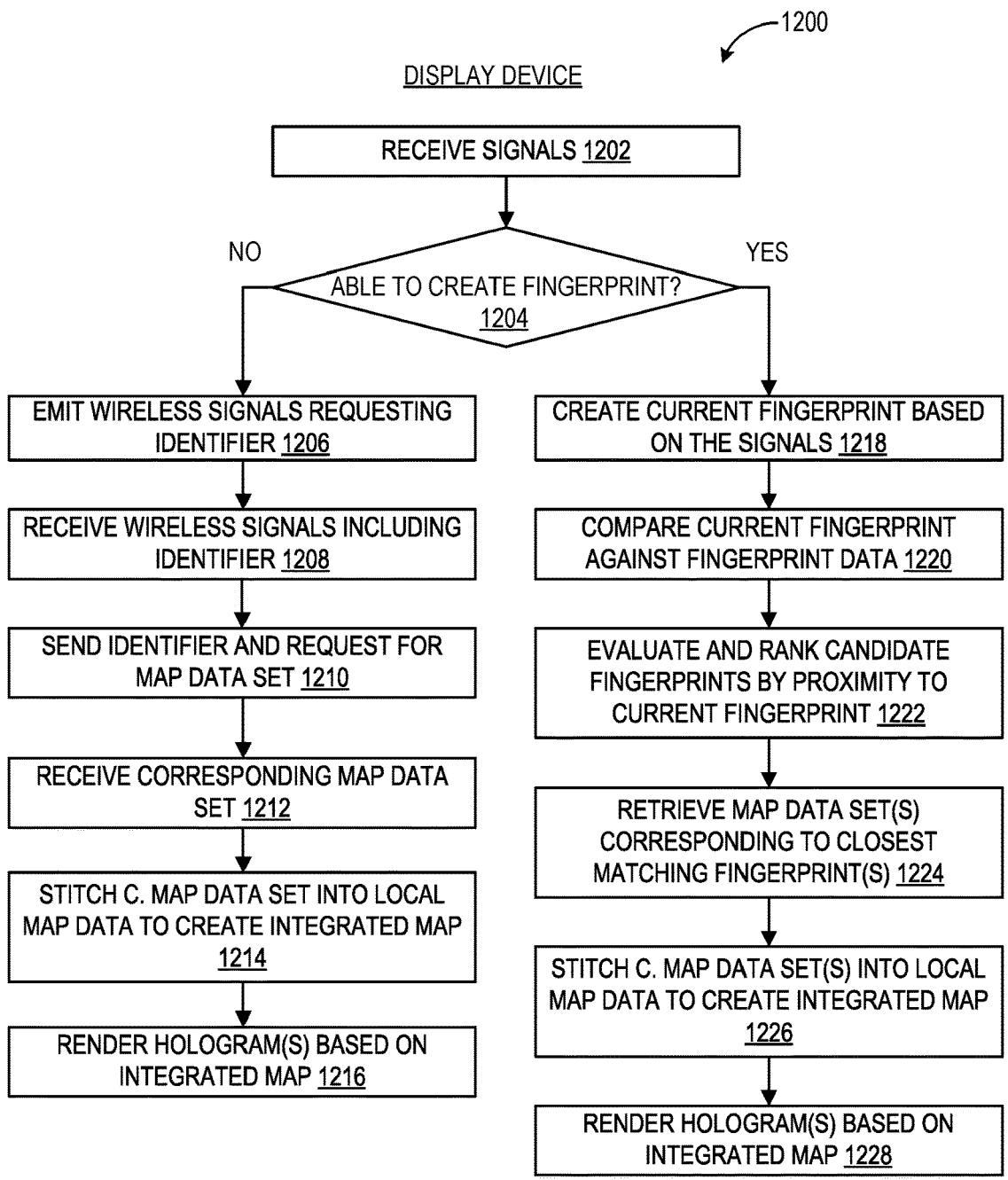

FIG. 11C illustrates a flow chart of a sixth configuration of a method 1200 for performing coarse localization according to an example of the present disclosure. In the sixth configuration of a method 1200, the display device initially attempts to receive signals from one or more signal sources to create a current fingerprint. If the quality of the received signals is determined to be sufficient to generate a current fingerprint, then the display device makes a map data set request based on the current fingerprint. Otherwise, if the quality of the received signals is determined to be insufficient to generate a current fingerprint, then the display device requests and receives a session-specific identifier from a neighboring device, and makes a map data set request based on the session-specific identifier. The following description of method 1200 is provided with reference to the software and hardware components described above and shown in FIGS. 1-7. It will be appreciated that method 1200 also may be performed in other contexts using other suitable hardware and software components.

With reference to FIG. 11C, at 1202 the method 1200 may include the sensors of the display device receiving signals from one or more signal sources. At 1204, the method 1200 determines whether the received signals are sufficient to generate a current fingerprint. When it is determined that the received signals are insufficient to generate the current fingerprint, the method 1200 proceeds to 1206. A number of received wireless signals below a predetermined threshold, or a signal-to-noise ratio below a predetermined threshold may indicate that the received signals are insufficient to generate the current fingerprint.

At 1206, the display device emits wireless signals requesting a session-specific identifier from a neighboring device. At 1208, the display device receives the wireless signals including the session-specific identifier from the neighboring device. At 1210, the display device sends the session-specific identifier and a request for a map data set to the cloud service. At 1212, the display device receives from the cloud service the map data set corresponding to the session-specific identifier. At 1214, the display device stitches the corresponding map data set into the local map data to create an integrated map. At 1216, the display device renders one or a plurality of holograms based on the integrated map.

At 1204, when it is determined that the received signals are sufficient to generate the current fingerprint, the method 1200 proceeds to 1218. A number of received wireless signals above a predetermined threshold, or a signal-to-noise ratio above a predetermined threshold may indicate that the received signals are sufficient to generate the current fingerprint.

At 1218, the display device generates a current fingerprint based on the received signals. At 1220, the display device compares the current fingerprint against the fingerprint data. At 1222, the display device evaluates and ranks candidate fingerprints in the fingerprint data by proximity to the current fingerprint. At 1224, the display device retrieves the one or the plurality of map data sets corresponding to the one or the plurality of closest matching fingerprints. At 1226, the display device stitches the corresponding map data set into the local map data to create an integrated map. At 1228, the display device renders one or a plurality of holograms based on the integrated map.

Figure 11D:
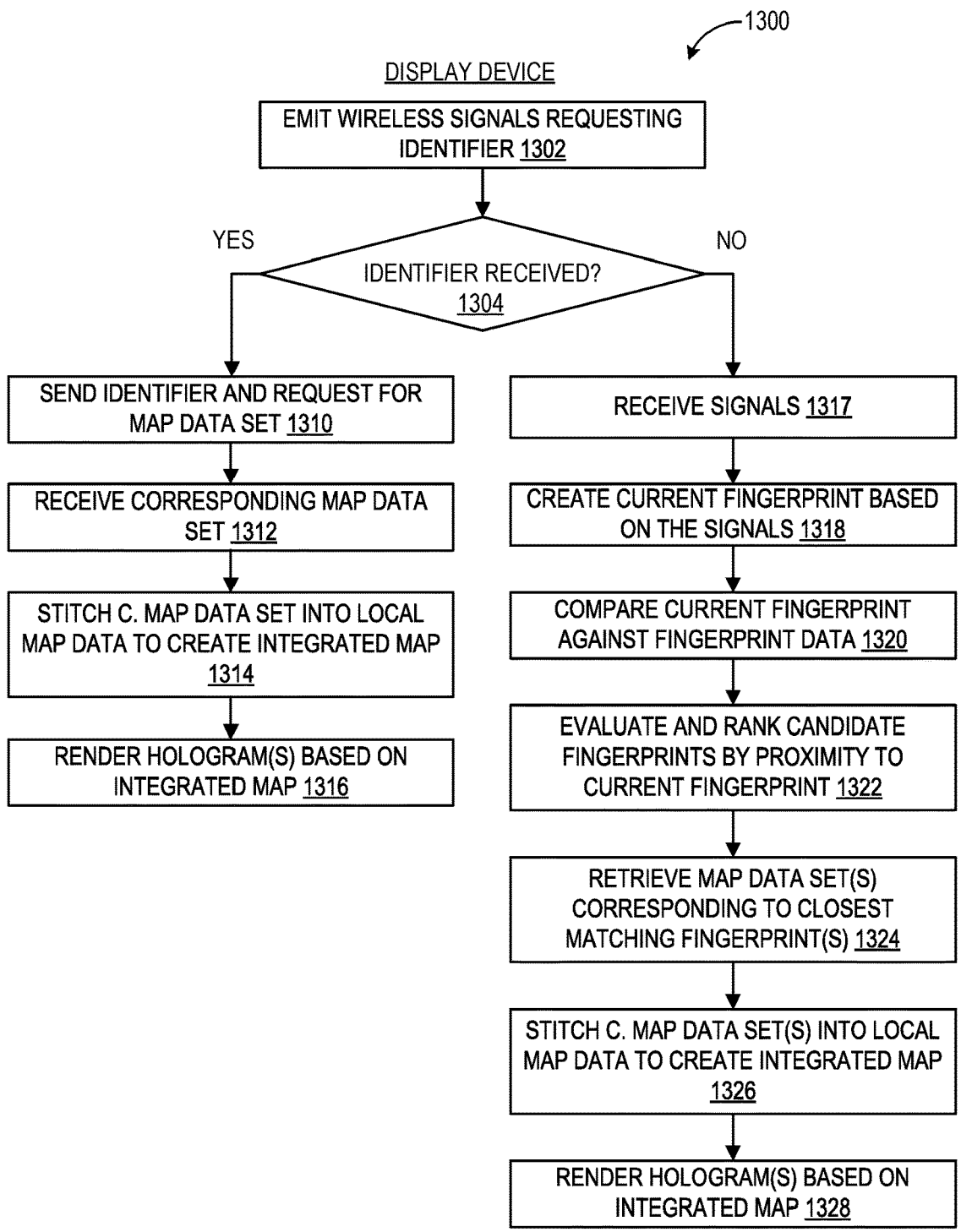

FIG. 11D illustrates a flow chart of a seventh configuration of a method 1300 for performing coarse localization according to an example of the present disclosure. In the seventh configuration of a method 1300, the display device initially attempts to reach a neighboring device, subscribed to the same cloud service, which provides a session-specific identifier to the display device. When the display device is successful in obtaining a session-specific identifier from a neighboring device, then the display device makes a map data set request based on the session-specific identifier. Otherwise, when the display device is unsuccessful in obtaining a session-specific identifier from a neighboring device, the display device receives signals from one or more signal sources to create a current fingerprint, and then makes a map data set request based on the current fingerprint. The following description of method 1300 is provided with reference to the software and hardware components described above and shown in FIGS. 1-7. It will be appreciated that method 1300 also may be performed in other contexts using other suitable hardware and software components.

At 1302, the display device emits wireless signals requesting a session-specific identifier from a neighboring device. At 1304, when the display device receives the wireless signals including the session-specific identifier from the neighboring device, then the method proceeds to 1310. At 1310, the display device sends the session-specific identifier and a request for a map data set to the cloud service. At 1312, the display device receives from the cloud service the map data set corresponding to the session-specific identifier. At 1314, the display device stitches the corresponding map data set into the local map data to create an integrated map. At 1316, the display device renders one or a plurality of holograms based on the integrated map.

At 1304, when the display device is unable to receive the wireless signals including the session-specific identifier from the neighboring device, then the method 1300 proceeds to 1317. At 1317, the sensors of the display device receive signals from one or more signal sources. At 1318, the display device generates a current fingerprint based on the received signals. At 1320, the display device compares the current fingerprint against the fingerprint data. At 1322, the display device evaluates and ranks candidate fingerprints in the fingerprint data by proximity to the current fingerprint. At 1324, the display device retrieves the map data set corresponding to the one or the plurality of closest matching fingerprints. At 1326, the display device stitches the corresponding map data sets into the local map data to create an integrated map. At 1328, the display device renders one or a plurality of holograms based on the integrated map.

The following paragraphs provide additional support for the claims of the subject application. One aspect provides a first display device, comprising a processor; a display; a memory operatively coupled to the processor and the display; and a client fingerprint program stored in the memory and executed by the processor of the first display device, the client fingerprint program being configured to receive a session-specific identifier from a second device, the session-specific identifier corresponding to a map data set; transmit the session-specific identifier to a remote system; receive from the remote system at least a portion of the map data set corresponding to the session-specific identifier; and stitch the map data set into a local map data of the first display device to create an integrated map. In this aspect, additionally or alternatively, the client fingerprint program may be further configured to cause the display of the first display device to display one or more holograms based on the map data corresponding to the session-specific identifier. In this aspect, additionally or alternatively, the map data set may comprise keyframes; and the keyframes and pose-graphs may record rotational and translational motion of the first display device through a real world three-dimensional environment. In this aspect, additionally or alternatively, at least two of the keyframes may be linked to a common fingerprint. In this aspect, additionally or alternatively, the map data set corresponding to the session-specific identifier may comprise neighboring map data of a neighborhood around one or a plurality of keyframes linked to the session-specific identifier. In this aspect, additionally or alternatively, when the client fingerprint program is unsuccessful in receiving the session-specific identifier from the second device, the client fingerprint program may be configured to receive one or a plurality of signals from one or a plurality of signal sources by at least one sensor of the first display device; generate a current signal fingerprint based on the received signals; determine map data to load by comparing the current signal fingerprint against signal fingerprint data to generate a ranked list of matching fingerprints, including performing a statistical analysis to evaluate for proximity or degree of disambiguation of the current signal fingerprint to the signal fingerprint data; and based on the ranked list, retrieve corresponding map data corresponding to the matching fingerprints in the ranked list. In this aspect, additionally or alternatively, the client fingerprint program may generate the session-specific identifier based on signals from signal sources, the signal sources comprising at least one of wireless access points, radiofrequency sources, electromagnetic sources, light sources, sound sources, and heat sources. In this aspect, additionally or alternatively, the signals may comprise beacon frames. In this aspect, additionally or alternatively, the session-specific identifier may be received from the second device via low energy beacons. In this aspect, additionally or alternatively, the client fingerprint program may transmit an identifier request; and the client fingerprint program may receive the session-specific identifier from the second device that received the transmitted identifier request.

Another aspect provides a method comprising receiving a session-specific identifier from a second device at a first display device, the session-specific identifier corresponding to a map data set; transmitting the session-specific identifier from the first display device to a remote system; receiving from the remote system at least a portion of the map data set corresponding to the session-specific identifier at the first display device; and stitching the map data set into a local map data to create an integrated map at the first display device. In this aspect, additionally or alternatively, the method may further comprise displaying one or more holograms based on the map data set corresponding to the session-specific identifier at the first display device. In this aspect, additionally or alternatively, the map data set may comprise keyframes; and the keyframes and pose-graphs may record rotational and translational motion of the first display device through a real world three-dimensional environment. In this aspect, additionally or alternatively, at least two of the keyframes may be linked to a common fingerprint. In this aspect, additionally or alternatively, the map data set corresponding to the session-specific identifier may comprise neighboring map data of a neighborhood around one or a plurality of keyframes linked to the session-specific identifier. In this aspect, additionally or alternatively, the session-specific identifier may be generated at the second device based on beacon frames of signals from signal sources. In this aspect, additionally or alternatively, the session-specific identifier may be generated at the second device based on signals from signal sources, the signal sources comprising at least one of wireless access points, radiofrequency sources, electromagnetic sources, light sources, sound sources, and heat sources. In this aspect, additionally or alternatively, the session-specific identifier may be received at the first display device from the second device via low energy beacons. In this aspect, additionally or alternatively, the method may further comprise transmitting an identifier request at the first display device; and at the first display device, receiving the session-specific identifier from the second device that received the transmitted identifier request.

Another aspect provides a server computing device, comprising a processor; a memory operatively coupled to the processor; signal fingerprint data stored in the memory; and a server fingerprint program stored in the memory and executed by the processor of the computing device, the server fingerprint program being configured to receive from a first mobile device a session-specific identifier generated by a second mobile device based on one or a plurality of signals from one or a plurality of signal sources received by at least one sensor of the second mobile device; and send to the first mobile device a corresponding map data set corresponding to the session-specific identifier, the corresponding map data set comprising neighboring map data of a neighborhood around one or a plurality of keyframes linked to the session-specific identifier, the neighboring map data captured and recorded by the second mobile device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A first display device, comprising:
a processor;
a display;
a memory operatively coupled to the processor and the display; and
a client fingerprint program stored in the memory and executed by the processor of the first display device, wherein
the client fingerprint program is configured to:
    receive a session-specific identifier from a second device, the session-specific identifier corresponding to a map data set;
    transmit the session-specific identifier to a remote system;
    receive from the remote system at least a portion of the map data set corresponding to the session-specific identifier; and
    stitch the map data set into a local map data of the first display device to create an integrated map.

2. The first display device of claim 1, wherein
the client fingerprint program is further configured to cause the display of the first display device to display one or more holograms based on the map data corresponding to the session-specific identifier.

3. The first display device of claim 2, wherein
the map data set comprises keyframes; and
the keyframes and pose-graphs record rotational and translational motion of the first display device through a real world three-dimensional environment.

4. The first display device of claim 3, wherein
at least two of the keyframes are linked to a common fingerprint.

5. The first display device of claim 3, wherein the map data set corresponding to the session-specific identifier comprises neighboring map data of a neighborhood around one or a plurality of keyframes linked to the session-specific identifier.

6. The first display device of claim 1, wherein when the client fingerprint program is unsuccessful in receiving the session-specific identifier from the second device, the client fingerprint program is configured to:
receive one or a plurality of signals from one or a plurality of signal sources by at least one sensor of the first display device;
generate a current signal fingerprint based on the received signals;
determine map data to load by comparing the current signal fingerprint against signal fingerprint data to generate a ranked list of matching fingerprints, including performing a statistical analysis to evaluate for proximity or degree of disambiguation of the current signal fingerprint to the signal fingerprint data; and
based on the ranked list, retrieve corresponding map data corresponding to the matching fingerprints in the ranked list.

7. The first display device of claim 1, wherein the client fingerprint program generates the session-specific identifier based on signals from signal sources, the signal sources comprising at least one of wireless access points, radiofrequency sources, electromagnetic sources, light sources, sound sources, and heat sources.

8. The first display device of claim 7, wherein the signals comprise beacon frames.

9. The first display device of claim 1, wherein the session-specific identifier is received from the second device via low energy beacons.

10. The first display device of claim 1, wherein the client fingerprint program transmits an identifier request; and
the client fingerprint program receives the session-specific identifier from the second device that received the transmitted identifier request.

11. A method comprising:
receiving a session-specific identifier from a second device at a first display device, the session-specific identifier corresponding to a map data set;
transmitting the session-specific identifier from the first display device to a remote system;
receiving from the remote system at least a portion of the map data set corresponding to the session-specific identifier at the first display device; and
stitching the map data set into a local map data to create an integrated map at the first display device.

12. The method of claim 11, further comprising:
displaying one or more holograms based on the map data set corresponding to the session-specific identifier at the first display device.

13. The method of claim 12, wherein the map data set comprises keyframes; and
the keyframes and pose-graphs record rotational and translational motion of the first display device through a real world three-dimensional environment.

14. The method of claim 13, wherein at least two of the keyframes are linked to a common fingerprint.

15. The method of claim 13, wherein the map data set corresponding to the session-specific identifier comprises neighboring map data of a neighborhood around one or a plurality of keyframes linked to the session-specific identifier.

16. The method of claim 11, wherein the session-specific identifier is generated at the second device based on beacon frames of signals from signal sources.

17. The method of claim 11, wherein the session-specific identifier is generated at the second device based on signals from signal sources, the signal sources comprising at least one of wireless access points, radiofrequency sources, electromagnetic sources, light sources, sound sources, and heat sources.

18. The method of claim 11, wherein the session-specific identifier is received at the first display device from the second device via low energy beacons.

19. The method of claim 11, further comprising:
transmitting an identifier request at the first display device; and
at the first display device, receiving the session-specific identifier from the second device that received the transmitted identifier request.

20. A server computing device, comprising:
a processor;
a memory operatively coupled to the processor;
signal fingerprint data stored in the memory; and
a server fingerprint program stored in the memory and executed by the processor of the computing device, wherein
the server fingerprint program is configured to:
receive from a first mobile device a session-specific identifier generated by a second mobile device based on one or a plurality of signals from one or a plurality of signal sources received by at least one sensor of the second mobile device; and
send to the first mobile device a corresponding map data set corresponding to the session-specific identifier, the corresponding map data set comprising neighboring map data of a neighborhood around one or a plurality of keyframes linked to the session-specific identifier, the neighboring map data captured and recorded by the second mobile device.

* * * * *